United States Patent
Bautista et al.

(10) Patent No.: US 11,521,288 B2
(45) Date of Patent: Dec. 6, 2022

(54) SYSTEM AND METHOD FOR MANAGING ACCESS TO PARKING ZONE

(71) Applicant: Samsung Electronics Co., Ltd., Suwon-si (KR)

(72) Inventors: Mark Andrew Dancel Bautista, Quezon (PH); Reuben Carlos N. Cruz, Quezon (PH); Richard Guinto, Pasig (PH); Nicholas Craig Ty Tan, Paranaque (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 16/481,387

(22) PCT Filed: Aug. 11, 2017

(86) PCT No.: PCT/KR2017/008758
§ 371 (c)(1),
(2) Date: Jul. 26, 2019

(87) PCT Pub. No.: WO2018/147519
PCT Pub. Date: Aug. 16, 2018

(65) Prior Publication Data
US 2019/0392543 A1    Dec. 26, 2019

(30) Foreign Application Priority Data

Feb. 13, 2017    (PH) .............................. 12017000044
Aug. 8, 2017    (KR) ......................... 10-2017-0100433

(51) Int. Cl.
*G06Q 50/30*    (2012.01)
*H04W 12/03*    (2021.01)

(52) U.S. Cl.
CPC ............ *G06Q 50/30* (2013.01); *H04W 12/03* (2021.01)

(58) Field of Classification Search
CPC ........ G06Q 50/30; H04W 12/03; H04W 4/40; H04W 4/023; A61B 5/00; G08G 1/149;
(Continued)

(56) References Cited

U.S. PATENT DOCUMENTS 5,288,164 A * 2/1994 Nasatka .................. E01F 13/12
                                                    404/10
8,502,698 B2 * 8/2013 Chen ...................... G08G 1/144
                                                    705/13

(Continued)

FOREIGN PATENT DOCUMENTS

DE         10027747 A1 * 12/2001 ......... B60R 25/1012
DE    102012005952 A1     9/2013
(Continued)

OTHER PUBLICATIONS

Razak, Zaidi, et. al; Car Park System: A Review of Smart Parking System and its Technology; Information Technology Journal, Feb. 2009 (Year: 2009).*

(Continued)

*Primary Examiner* — Resha Desai
*Assistant Examiner* — Dione N. Simpson

(57) ABSTRACT

A server device includes: a receiver configured to receive, from a management device installed in a parking zone, information about a vehicle, which enters the parking zone, obtained from an exterior of the vehicle and wireless identification information obtained from a mobile terminal in the vehicle; a controller configured to generate first encryption information corresponding to the vehicle, by using the information about the vehicle and the wireless identification information; and a transmitter configured to, when a parking area is assigned to the vehicle, transmit information about the parking area to the mobile terminal.

14 Claims, 21 Drawing Sheets

(58) Field of Classification Search
CPC ............ H04M 1/72403; G06K 9/3258; G06K 2209/15
USPC .......................................................... 705/13
See application file for complete search history.

(56) References Cited

U.S. PATENT DOCUMENTS

| | | | | |
|---|---|---|---|---|
| 2012/0323643 | A1* | 12/2012 | Volz | G06Q 30/0266 705/13 |
| 2014/0207541 | A1* | 7/2014 | Nerayoff | G06Q 50/30 382/104 |
| 2015/0125042 | A1 | 5/2015 | Haden et al. | |
| 2016/0042575 | A1* | 2/2016 | Ganguly | G07B 15/02 705/13 |
| 2017/0140586 | A1* | 5/2017 | Volz | G06Q 10/02 |
| 2018/0015801 | A1* | 1/2018 | Mohamed | B60G 17/06 |

FOREIGN PATENT DOCUMENTS

| | | | |
|---|---|---|---|
| EP | 1227445 | A1 | 7/2002 |
| JP | 2001283387 | A | 10/2001 |
| JP | 2002251640 | * | 6/2002 |
| JP | 2002251640 | * | 9/2002 |
| JP | 2002251640 | A | 9/2002 |
| JP | 2003016487 | A | 1/2003 |
| JP | 2012221347 | A | 11/2012 |
| JP | 2014-232520 | A | 12/2014 |
| JP | 2015-22736 | A | 2/2015 |
| KR | 10-0585516 | B1 | 6/2006 |
| KR | 10-2011-0097208 | A | 8/2011 |
| KR | 10-1367264 | B1 | 2/2014 |
| KR | 10-20150070987 | A | 6/2015 |
| KR | 10-2016-0092120 | A | 8/2016 |
| WO | 9719568 | A1 | 5/1997 |
| WO | WO-2017017114 | A1 * | 2/2017 ............. B60R 25/24 |

OTHER PUBLICATIONS

Mohd Yamani Idna Idris; "Car Park System: A Review of Smart Parking System and its Technology"; Information Technology Journal; Feb. 2009. (Year: 2009).*

ISA/KR, "International Search Report and Written Opinion of the International Searching Authority," International Application No. PCT/KR2017/008758, dated Oct. 31, 2017, 11 pages.

Notice of Non-final Rejection dated Jan. 19, 2022, in connection with Korean Application No. 10-2017-0100433, 12 pages.

Intellectual Property Office of the Philippines Bureau of Patents, "Formality Examination Report," dated Mar. 2, 2018, in connection with Philippine Patent Application No. PH12017000044, 9 pages.

* cited by examiner

FIG. 3
310
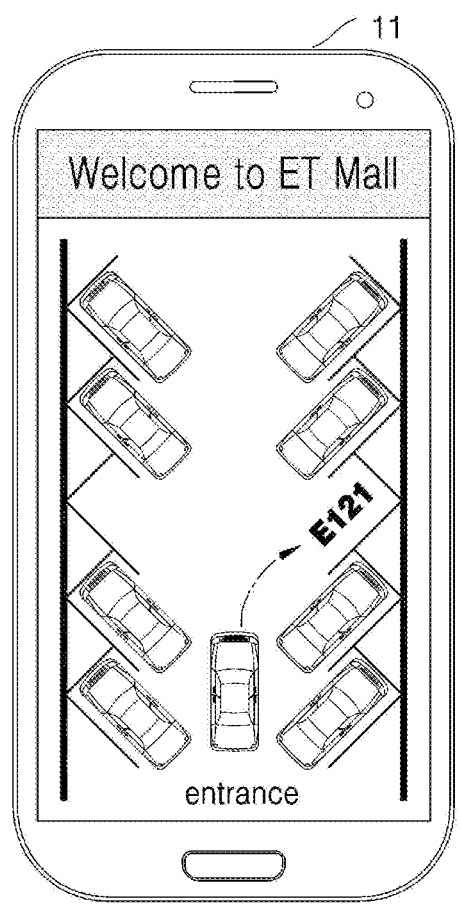
320

Parking entrance

Parking exit

SYSTEM AND METHOD FOR MANAGING ACCESS TO PARKING ZONE

CROSS-REFERENCE TO RELATED APPLICATIONS

This application is a 371 National Stage of International Application No. PCT/KR2017/008758, filed Aug. 11, 2017, which claims priority to Philippine Patent Application No. 12017000044, filed Feb. 13, 2017, and Korean Patent Application No. 10-2017-0100433, filed Aug. 8, 2017, the disclosures of which are herein incorporated by reference in their entirety.

BACKGROUND

1. Field

The present disclosure relates to a parking zone access management system and method. More particularly, the present disclosure relates to a parking zone access management system for managing access to a parking zone by using wireless identification information of a mobile terminal in a vehicle, and a parking zone management method and a parking zone management device.

2. Description of Related Art

In general, an access management system of a parking facility for vehicles issues a parking ticket for a vehicle entering the parking facility. However, the issued parking ticket is not associated with the vehicle. Accordingly, a robber possessing the parking ticket (irrespective of whether the parking ticket is a paper ticket, a magnetic card ticket, or a radio-frequency frequency identification (RFID) batch ticket) may easily take the vehicle out of the parking facility without violating a security protocol and a fraud detection system of the parking facility.

Also, a hard drive or another similar storage medium including vehicle-related data in the access management system of the parking facility for vehicles is vulnerable to data theft. However, the access management system of the parking facility whose implementation involves a computer does not address security issues. Accordingly, there is a demand for improved security management of vehicle-related data handled by a parking zone access management system.

SUMMARY

An embodiment of the present disclosure discloses a parking zone access management system and method for enhancing security of a vehicle, by generating and verifying encryption information by using information obtained from the vehicle entering or exiting a parking zone.

A parking zone management device according to an embodiment may include: a sensor configured to obtain information about a vehicle, which enters a parking zone, from an exterior of the vehicle; a communicator configured to obtain wireless identification information from a mobile terminal in the vehicle; and a controller configured to obtain first encryption information corresponding to the vehicle by using the information about the vehicle and the wireless identification information, and when a parking area is assigned to the vehicle, transmit information about the parking area to the mobile terminal.

The controller of the parking zone management device according to an embodiment may be further configured to control a blocker to cause the vehicle to move to the parking area assigned to the vehicle.

The controller of the parking zone management device according to an embodiment may be further configured to generate the first encryption information, by encrypting part or all of the obtained information about the vehicle, by using the wireless identification information and the information about the parking area as an encryption key.

The controller of the parking zone management device according to an embodiment may be further configured to generate the first encryption information, by further using position information of the vehicle.

The controller of the parking zone management device according to an embodiment may be further configured to generate the first encryption information, by using at least one of an attribute-based encryption method, an identification-based encryption method, and a certificate-less authenticated encryption method.

The communicator of the parking zone management device according to an embodiment may be further configured to transmit the first encryption information to a server connected to the parking zone management device.

The sensor of the parking zone management device according to an embodiment may be further configured to obtain the information about the vehicle, which tries to exit the parking zone, from the exterior of the vehicle, the communicator may be further configured to obtain the wireless identification information from the mobile terminal in the vehicle, and the controller may be further configured to generate second encryption information by using the information about the vehicle and the wireless identification information and determine whether to allow passage of the vehicle based on a result obtained after the second encryption information is compared with the first encryption information that is pre-stored.

The controller of the parking zone management device according to an embodiment may be further configured to, when the second encryption information matches the first encryption information, allow passage of the vehicle by changing a position of the blocker from a first position to a second position.

The controller of the parking zone management device according to an embodiment may be further configured to, when the second encryption information is different from the first encryption information, block passage of the vehicle by maintaining the position of the blocker at the first position.

The controller of the parking zone management device according to an embodiment may be further configured to transmit the second encryption information to the server, receive a comparison result obtained after comparing the second encryption information with the first encryption information from the server, and control the blocker based on the comparison result.

The communicator of the parking zone management device according to an embodiment may be further configured to transmit, to the mobile terminal, information about a movement path from a current position of the vehicle to the parking area.

A parking zone management method according to an embodiment may include: obtaining information about a vehicle, which enters a parking zone, from an exterior of the vehicle; receiving wireless identification information from a mobile terminal in the vehicle; obtaining first encryption information corresponding to the vehicle, by using the information about the vehicle and the wireless identification information; and, when a parking area is assigned to the vehicle, transmitting information about the parking area to the mobile terminal.

The parking zone management method according to an embodiment may further include controlling a blocker to cause the vehicle to move to the parking area assigned to the vehicle.

The parking zone management method according to an embodiment may further include encrypting part or all of the information about the vehicle, by using the wireless identification information and the information about the parking area as an encryption key.

The parking zone management method according to an embodiment may include generating the first encryption information, by further using position information of the vehicle.

The parking zone management method according to an embodiment may further include transmitting the first encryption information to a server connected to a parking zone management device.

The parking zone management method according to an embodiment may further include: obtaining the information about the vehicle, which tries to exit the parking area, from the exterior of the vehicle; receiving the wireless identification information from the mobile terminal in the vehicle; generating second encryption information, by using the information about the vehicle and the wireless identification information; and controlling the blocker to cause the vehicle to exit the parking zone, based on a result obtained after comparing the second encryption information with the first encryption information that is pre-stored.

The parking zone management method according to an embodiment may include: transmitting the second encryption information to the server; receiving a comparison result obtained after comparing the second encryption information with the first encryption information from the server; and controlling the blocker, based on the comparison result.

The information about the vehicle according to an embodiment may include at least one of information about a number of the vehicle, information about a manufacturer of the vehicle, and information about a model of the vehicle.

A server device according to an embodiment may include: a receiver configured to receive, from a management device installed in a parking zone, information about a vehicle, which enters the parking zone, obtained from an exterior of the vehicle and wireless identification information obtained from a mobile terminal in the vehicle; a controller configured to generate first encryption information corresponding to the vehicle, by using the information about the vehicle and the wireless identification information; and a transmitter configured to, when a parking area is assigned to the vehicle, transmit information about the parking area to the mobile terminal.

The transmitter of the server device according to an embodiment may be further configured to transmit, to the management device, a signal for controlling a blocker to cause the vehicle to move to the parking area assigned to the vehicle.

The controller of the server device according to an embodiment may be further configured to generate the first encryption information, by encrypting part or all of the information about the vehicle, by using the wireless identification information and the information about the parking area as an encryption key.

The controller of the server device according to an embodiment may be further configured to generate the first encryption information, by further using position information of the vehicle.

The controller of the server device according to an embodiment may be further configured to obtain biometric information of a user riding in the vehicle, and generate the first encryption information, by further using the biometric information.

The receiver of the server device according to an embodiment may be further configured to receive, from the management device, the information about the vehicle, which tries to exit the parking zone, obtained from the exterior of the vehicle and the wireless identification information obtained from the mobile terminal in the vehicle, the generator is further configured to generate second encryption information, by using the information about the vehicle and the wireless identification information, and the transmitter is further configured to transmit, to the management device, a signal for controlling a blocker to cause the vehicle to exit the parking zone, based on a result obtained after comparing the second encryption information with the first encryption information that is pre-stored.

The transmitter of the server device according to an embodiment may be further configured to transmit information about a movement path from a current position of the vehicle to the parking area to the mobile terminal.

A method, performed by a server device, of managing a parking zone according to an embodiment may include: receiving, from a management device installed in a parking zone, information about a vehicle, which enters the parking zone, obtained from an exterior of the vehicle and wireless identification information obtained from a mobile terminal in the vehicle; generating first encryption information corresponding to the vehicle, by using the information about the vehicle and the wireless identification information; and, when a parking area is assigned to the vehicle, transmitting information about the parking area to the mobile terminal.

The method according to an embodiment may include: obtaining biometric information of a user riding in the vehicle; and generating the first encryption information, by further using the biometric information.

The method may further include: receiving, from the management device, the information about the vehicle, which tries to exit the parking zone, obtained from the exterior of the vehicle and the wireless identification information obtained from the mobile terminal in the vehicle; generating second encryption information, by using the information about the vehicle and the wireless identification information; and transmitting, to the management device, a signal for controlling a blocker to cause the vehicle to exit the parking zone, based on a result obtained after comparing the second encryption information with the first encryption information that is pre-stored.

BRIEF DESCRIPTION OF DRAWINGS

FIG. 3 is a view for describing information about a parking area assigned to a vehicle transmitted to a mobile terminal according to an embodiment.

DETAILED DESCRIPTION

Figure 1:
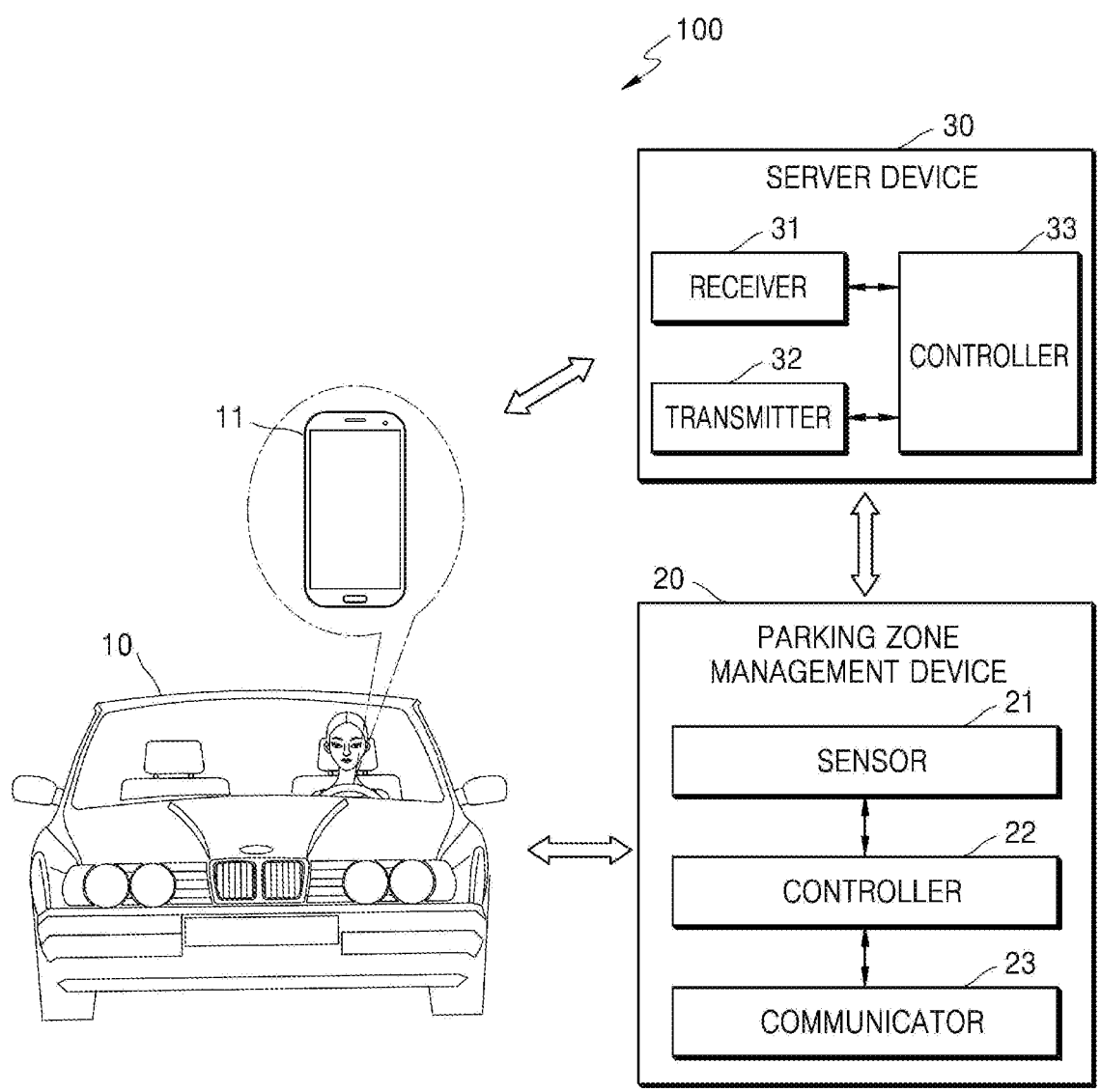
FIG. 1 is a diagram for describing a parking zone access management system according to an embodiment.

The terms used in the present specification are briefly described and the present disclosure is described in detail.

Although the terms used in the present disclosure have been selected from general terms in consideration of the functions in the present disclosure, these terms may vary according to the intention of any person of ordinary skill in the art, legal precedents, or the advent of new technologies. Further, in special cases, for terms selected by the applicant, the meanings of these selected terms are described in detail in the Detailed Description section. Accordingly, the terms used in the present disclosure are defined based on the descriptions throughout the specification, not by their simple meanings.

When a part "includes" or "comprises" an element, unless there is a particular description contrary thereto, the part may further include other elements, not excluding the other elements. Also, the terms such as " . . . unit" and " . . . module" refer to units that perform at least one function or operation, and the units may be implemented as hardware or software or as a combination of hardware and software.

In the present specification, a "system" may include one or more hardware, software, a combination of hardware and software, or firmware components, and may refer to an electronic computing device or devices or one or more sub-systems thereof.

In the present specification, the term "entity" may refer to a human and/or a legal figure related to the use or utilization of one or more parts of the present disclosure. According to an embodiment, examples of an entity may include, but are not limited to, an individual, an organization, an association, and a service provider. Examples of an entity may include a vehicle driver, a mobile phone user or a mobile application user, a parking zone operator, a system manager, a site owner, an Internet service provider, a payment service provider, and a communication service provider.

The term "encryption sequence" and/or "decryption sequence" in the present specification may refer to a logic and/or an algorithm maintained and managed in or extracted from a library of encryption/decryption keys and/or encryption/decryption codes. In a parking zone access management system disclosed in the present specification, an encryption/decryption sequence may be recognized as a mechanism featuring connection of two or more keys or codes, an inversion method, or a "pseudo-random" number sequence among available different mechanisms.

The term "encryption parameter" and/or "decryption parameter" in the present specification may refer to a configurable variable that may be updated one or more times in a pre-determined time interval or cycle, or may refer to a plurality of configurable variables that may be updated one or more times in a pre-determined time interval or cycle. As a configurable variable related to an encryption/decryption parameter, at least one may be selected from among a symmetric encryption key, an asymmetric encryption key, a symmetric key cipher, a pseudorandom cipher digit stream, a value for encryption and decryption, a key for a hash function, a nonce for authentication, a seed of a random number generator, a seed for a pseudorandom number generator, a bit string, and a bitwise operation on a bit string. One or an appropriate combination of the above variables may define a rule or a regulation for controlling the behavior of an encryption/decryption sequence.

The term "data communication network" in the present specification may refer to communication systems that may include a plurality of on-board communication devices, a plurality of parking management server devices, and a plurality of central control devices suitable for wireless communication. For example, a data communication network may refer to data communication systems including one or more from among a public or private data network, a hybrid public and private data network, a wired or wireless data network, an Internet protocol (IP) framework, a wireless local area network (WLAN), a wireless wide area network (WWAN), a global area network (GAN), a metropolitan area network (MAN), a long term evolution (LTE) network for all generations, a mobile worldwide interoperability for microwave access (WiMax) network, a corporate Intranet, and/or a combination thereof.

The term "radio communication system" in the present specification may generally refer to a communication system that may include a plurality of on-board communication devices, a plurality of central control devices, and a plurality of parking blocking devices suitable for wireless communication, and may specifically refer to various wireless access technologies, a bidirectional wireless communication framework, and/or a short-range wireless communication framework, a path, and a protocol well known in the art.

A wireless access technology may include or may be based on Bluetooth™, Bluetooth™ low energy (BLE), an IEEE protocol selected from among IEEE 802.15 and 802.11x protocols, other available IEEE protocols not related to 802.11x, Zigbee™, Z-Wave™, wireless local area network (WLAN), wireless fidelity (Wi-Fi), a radio-frequency identification (RFID) system, a near-field communication (NFC) system, general packet radio service (GPRS), global system for mobile telecommunications (GSM), high speed downlink packet access (HSDPA), high speed uplink packet access (HSUPA), a worldwide interoperability for microwave access (WiMax) network, code division multiple access (CDMA), a radio-frequency (RF) protocol, an infrared protocol, general hardware-oriented software transfer (GHOST), a protocol, and digital living network alliance (DLNA), and/or an appropriate combination thereof.

Hereinafter, embodiments of the present disclosure will be described in detail with reference to the accompanying drawings in order to enable one of ordinary skill in the art to easily embody and practice the embodiments of the present disclosure. However, the present disclosure is not limited to embodiments disclosed below, but may be implemented in various forms. Also, parts in the drawings unrelated to the detailed description are omitted to ensure clarity of the present disclosure, and like reference numerals in the drawings denote like elements.

FIG. 1 is a diagram for describing a parking zone access management system according to an embodiment.

Referring to FIG. 1, a parking zone access management system 100 according to an embodiment may include a vehicle 10, a mobile terminal 11 in the vehicle 10, a parking zone management device 20, and a server device 30. However, all of the elements illustrated in FIG. 1 are not essential elements. The parking zone access management system 100 may include elements more or fewer than the elements illustrated in FIG. 1. For example, the parking zone access management system 100 may include only the vehicle 10, the mobile terminal 11 in the vehicle 10, and the parking zone management device 20, without the server device 30. The elements will now be sequentially described.

Examples of the mobile terminal 11 may include, but are not limited to, a smartphone, a digital camera, a laptop computer, a tablet personal computer (PC), an electronic book terminal, a digital broadcast terminal, a personal digital assistant (PDA), a portable multimedia player (PMP), a navigation system, and an MP3 player. The mobile terminal 100 may be a wearable device that may be worn around a user (or a driver). The wearable device may include at least one of an accessory-type device (e.g., a watch, a ring, a bracelet, an anklet, a necklace, glasses, or contact lenses), a head-mounted-device (HMD), a fabric or clothing-integrated device (e.g., electronic clothing), a body-attachable device (e.g., a skin pad), and a bio-implantable device (e.g., an implantable circuit). However, for convenience of explanation, the following will be described on the assumption that the mobile terminal 100 is a mobile phone. The mobile terminal 11 is located in the vehicle 10, and thus may be referred to as an on-board communication device.

The mobile terminal 11 may receive a mobile parking ticket from the parking zone management device 20, and may output the mobile parking ticket. When a paper parking ticket is issued, it is inconvenient to carry the paper parking ticket and it is easy to lose the paper parking ticket, but when a mobile parking ticket is received by the mobile terminal 11, inconvenience due to the possession of a paper parking ticket may be reduced.

The parking zone management device 20 may be a device that manages the vehicle 10 entering and/or exiting a parking zone. For convenience of explanation, the parking zone management device 20 may be referred to as a management device installed in the parking zone. The parking zone management device 20 may be located in or around the parking zone.

The term "parking zone" in the present specification may refer to a physical place, a facility, and/or a structure designed to park various land vehicles such as cars, trucks, excavators, and tractors. The parking zone may also be designed to park watercraft, recreational vehicles, air vehicles, or space vehicles. Examples of the parking zone may include, but are not limited to, an indoor parking place, an outdoor parking place, an undercroft parking area, a multi-level parking structure, and a hybrid elevated parking area.

The parking zone management device 20 according to an embodiment may include a sensor 21, a controller 22, and a communicator 23.

The sensor 21 may include at least one sensor for capturing an exterior image, a vehicle number, and a vehicle manufacturer symbol (e.g., an emblem or a logo of a vehicle manufacturer) of the vehicle 10 entering or exiting the parking zone. Examples of the sensor 21 may include, but are not limited to, a general image sensor, an infrared sensor, a depth sensor for detecting a three-dimensional (3D) image, and a motion sensor. Also, according to an embodiment, the sensor 112 may further include an image processor for analyzing a captured image. Hereinafter, for convenience of explanation, the sensor 21 may be referred to as an image-capturing device.

The controller 22 controls an overall operation of the parking zone management device 20. For example, the controller 22 may control the sensor 21 and the communicator 23, by executing programs stored in a memory.

According to an embodiment, when the vehicle 10 enters or exits the parking zone, the controller 22 may receive information about the vehicle 10 (e.g., a vehicle number, a vehicle manufacturer, or a vehicle model) from the sensor 21, and may receive wireless identification information of the mobile terminal 11 from the communicator 23.

The controller 22 may generate encryption information by using the information about the vehicle 10 entering the parking zone and the wireless identification information of the mobile terminal 10 and, when the vehicle 10 tries to exit the parking zone, may prevent the vehicle 10 from being stolen by verifying the encryption information by using again the information about the vehicle 10 and the wireless identification information of the mobile terminal 11. An operation of the controller 22 will be described below in detail with reference to FIGS. 2 through 4. Hereinafter, the controller 22 may be referred to as a central control device.

The communicator 23 may include one or more elements through which the parking zone management device 20 may communicate with an external device or the server device 30. For example, the communicator 23 may include, but is not limited to, a short-range communicator and a mobile communicator. Examples of a short-range communicator 121 may include, but are not limited to, a Bluetooth communicator, a BLE communicator, a near-field communicator, a WLAN (Wi-Fi) communicator, a Zigbee communicator, an infrared data association (IrDA) communicator, a Wi-Fi Direct (WFD) communicator, an ultra-wideband (UWB) communicator, and an Ant+ communicator. A mobile communicator 122 transmits/receives a wireless signal to/from at least one of a base station, an external terminal, and the server device 30 via a mobile communication network.

According to an embodiment, the communicator 23 may obtain the wireless identification information from the mobile terminal 11 located in the vehicle 10 entering or exiting the parking zone, and may transmit the obtained wireless identification information to the controller 22. Hereinafter, for convenience of explanation, the communicator 23 may be referred to as a wireless communication reading device.

According to an embodiment, the parking zone management device 20 may include elements more than those illustrated in FIG. 1. For example, the parking zone management device 20 may further include a blocker and a memory.

The server device 30 may communicate with the mobile terminal 11 or the parking zone management device 20. According to an embodiment, the server device 30 may receive encryption information corresponding to a specific vehicle from the parking zone management device 20, and may store the encryption information corresponding to the specific vehicle. Also, the server device 30 may directly generate and verify the encryption information corresponding to the specific vehicle.

According to an embodiment, the server device 30 may provide a parking-related application for a driver to the mobile terminal 11. The server device 30 may provide a parking-related application for a manger to the parking zone management device 20. In this case, the mobile terminal 11, the server device 30, and the parking zone management device 20 may be connected through the parking-related applications. Hereinafter, the server device 30 may be referred to as a parking management server device.

According to an embodiment, the server device 30 may include a receiver 31, a transmitter 32, and a controller 33. According to an embodiment, the receiver 21 and the transmitter 32 may be implemented as one communication interface. According to an embodiment, the server device 30 may include elements more than those illustrated in FIG. 1. For example, the server device 30 may further include a storage for storing the encryption information.

The receiver 31 may receive, from the parking zone management device 20, the information about the vehicle 10 obtained from the exterior of the vehicle 10 entering the parking zone. Also, the receiver 31 may receive, from the parking zone management device 20, the wireless identification information obtained from the mobile terminal 11 in the vehicle 10. An operation, performed by the parking zone management device 20, of obtaining the information about the vehicle 10 and the wireless identification information will be described below in detail with reference to FIG. 2. According to an embodiment, the receiver 31 may receive the information about the vehicle 10 and the wireless identification information that are transmitted or broadcast by the vehicle 10 by using vehicle-to-everything (V2X) (e.g., dedicated short-range communication (DSRC) or wireless access in vehicular environments (WAVE)).

When the vehicle 10 tries to exit the parking zone, the receiver 31 may receive again, from the parking zone management device 20, the information about the vehicle 10 and the wireless identification information obtained from the mobile terminal 11 in the vehicle 10, in order to verify the vehicle 10.

According to an embodiment, the receiver 31 may receive biometric information of the user riding in the vehicle 10. For example, the receiver 31 may receive the biometric information of the user from the mobile terminal 11, and may receive the biometric information of the user from the parking zone management device 20. An operation, performed by the mobile terminal 11, of obtaining the biometric information of the user will be described below in detail with reference to FIG. 20.

When a parking area is assigned to the vehicle 10, the transmitter 32 may transmit information about the parking area to the mobile terminal 11. According to an embodiment, the transmitter 32 may transmit information about a movement path from a current position of the vehicle 10 to the parking area to the mobile terminal 11. An operation, performed by the mobile terminal 11, of displaying the information about the parking area and the information about the movement path from the current position to the parking area will be described below in more detail with reference to FIG. 3.

The transmitter 32 may transmit a signal for controlling a blocker to the parking zone management device 20. For example, the transmitter 32 may transmit, to the parking zone management device 20, a signal for controlling the blocker to cause the vehicle 10 entering the parking zone to move to the parking area assigned to the vehicle 10. Also, when verification of the vehicle 10 trying to exit the parking zone is completed, the transmitter 32 may transmit, to the parking zone management device 20, a signal for controlling the blocker to cause the vehicle 10 to exit the parking area.

The controller 33 may control an overall operation of the server device 30. For example, the controller 33 may control the receiver 31, the transmitter 32, and a storage (not shown).

The controller 33 may generate first encryption information corresponding to the vehicle 10 entering the parking area by using the information about the vehicle 10 and the wireless identification information, and may store the first encryption information. For example, the controller 33 may generate the first encryption information, by encrypting part or all of the information about the vehicle 10, by using the wireless identification information and the information about the parking area as an encryption key. The controller 33 may generate the first encryption information, by further using position information of the vehicle 10. The controller 33 may generate the first encryption information, by further using the biometric information of the user riding in the vehicle 10.

When the vehicle 10 tries to exit the parking zone, the controller 33 may generate second encryption information, by using the information about the vehicle 10 and the wireless identification information. In this case, the second encryption information may be generated by using the same encryption algorithm as that used to generate the first encryption information.

A method, performed by the controller 33, of generating encryption information may be similar to a method, performed by the parking zone management device 20, of generating encryption information. An operation, performed by the parking zone management device 20, of generating encryption information will be described below in detail with reference to FIG. 2.

The controller 33 may compare the second encryption information with the first encryption information that is pre-stored. According to an embodiment, the controller 33 may check whether there is encryption information (i.e., the first encryption information) matching the second encryption information in an encryption information list stored in the storage. Alternatively, when the first encryption information is matched to identification information of the vehicle and is stored, the controller 33 may extract the first encryption information that is matched to the identification information of the vehicle and is stored from the storage, and may determine whether the extracted first encryption information matches the second encryption information.

According to an embodiment, the parking zone management device 20 and the server device 30 may be implemented as separate devices, or may be implemented as one device.

According to an embodiment, the parking zone management device 20 or the server device 30 may prevent the vehicle 10 in the parking zone from being stolen, by managing the entry/exit of the vehicle 10 to/from the parking zone, by using the information about the vehicle 10 and information received from the mobile terminal 11 in the vehicle 10. Hereinafter, a method, performed by the parking zone management device 20, of managing the vehicle 10 entering/exiting the parking zone will be described in more detail with reference to FIGS. 2 through 4.

Figure 2:
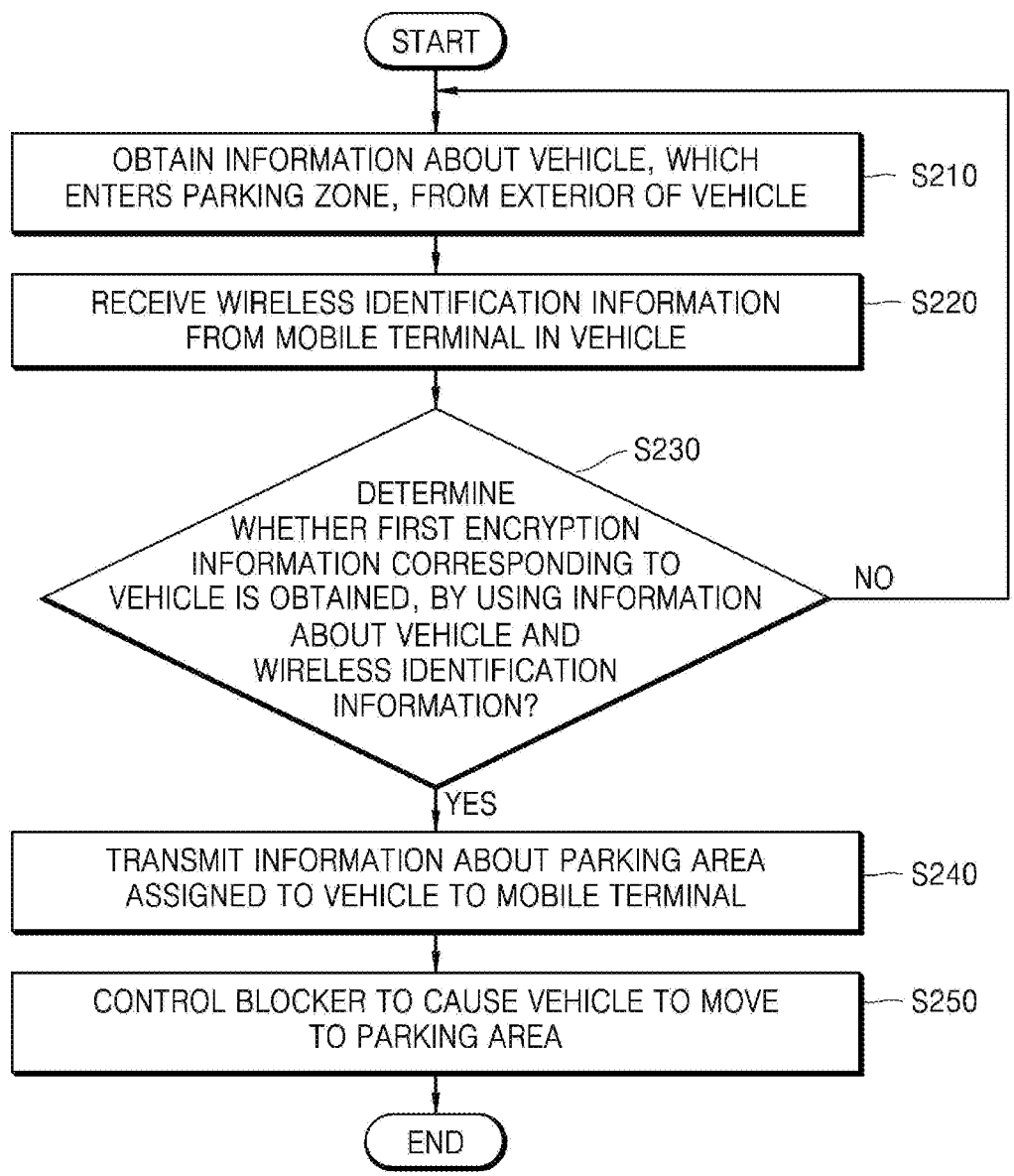
FIG. 2 is a flowchart for describing a parking zone management method according to an embodiment.

FIG. 2 is a flowchart for describing a parking zone management method according to an embodiment.

In operation S210, the parking zone management device 20 may obtain information about a vehicle, which enters a parking zone, from the exterior of the vehicle. For example, the parking zone management device 20 may obtain, as the information about the vehicle, at least one of information about a number of the vehicle, information about a manufacturer (e.g., a company or an organization) of the vehicle, and information about a model of the vehicle.

According to an embodiment, the parking zone management device 20 may capture a number plate image of the vehicle by using the sensor 21, and may analyze the captured number plate image. For example, the parking zone management device 20 may obtain the information about the number of the vehicle, by performing an optical character recognition (OCR) operation on the captured number plate image.

According to an embodiment, the parking zone management device 20 may capture an image of an emblem or a logo on the exterior of the vehicle, and may analyze the captured image. For example, the parking zone management device 20 may obtain the information about the manufacturer of the vehicle, by comparing the emblem or the logo included in the captured image with an emblem and/or logo table that is pre-stored. For example, when a first logo included in the captured image is a logo of a company A, the parking zone management device 20 may determine that the company A is the manufacturer of the vehicle, and when a second emblem included in the captured image is an emblem of a company B, the parking zone management device 20 may determine that the company B is the manufacturer of the vehicle.

According to an embodiment, the parking zone management device 20 may determine the model of the vehicle, by analyzing an exterior image of the vehicle. For example, the parking zone management device 20 may determine the model of the vehicle entering the parking zone, by comparing the exterior image of the vehicle with a vehicle model feature table that is pre-stored.

According to another embodiment, the parking zone management device 20 may obtain information about a first vehicle from the first vehicle through the communicator 23. For example, the first vehicle may broadcast or advertise a packet in a predetermined cycle by using V2X (e.g., DSRC or WAVE). In this case, the packet may include a first vehicle number and a first vehicle manufacturer.

DSRC that is wireless mobile communication specifically for vehicles is one of communication means for providing an intelligent transportation system (ITS) service. DSRC is currently used as a communication module of an automatic toll collection system worldwide.

WAVE is a communication method supporting a next-generation ITS. WAVE is an ITS specialized to provide a communication service in high-speed vehicular environments. WAVE includes the IEEE 802.11p and IEEE 1609x.

When the packet including the first vehicle number and the first vehicle manufacturer is received from the first vehicle, the parking zone management device 20 may obtain information such as the first vehicle number and the first vehicle manufacturer, by analyzing the received packet.

In operation S220, the parking zone management device 20 may receive wireless identification information from the mobile terminal 11 in the vehicle. The wireless identification information may include a unique identifier, and may be, but is not limited to, a series of codes including letters, numbers, and/or special symbols. For example, the wireless identification information may include, but is not limited to, NFC ID, Bluetooth ID, and a two-dimensional (2D) barcode.

According to an embodiment, the parking zone management device 20 may receive the wireless identification information from the mobile terminal 11, by using various wireless communication technologies. For example, the parking zone management device 20 may receive, from the mobile terminal 11, the wireless identification information through one of, but not limited to, Bluetooth, BLE, Zigbee, Wi-Fi, RFID, and NFC.

According to an embodiment, the parking zone management device 20 may receive the wireless identification information that is broadcast in the mobile terminal 11 in the vehicle. Alternatively, the parking zone management device 20 may request the mobile terminal 11 in the vehicle for the wireless identification information and may receive the wireless identification information from the mobile terminal 11 in the vehicle.

In operation S230, the parking zone management device 20 may obtain first encryption information corresponding to the vehicle, by using the information about the vehicle and the wireless identification information.

According to an embodiment, the parking zone management device 20 may generate the first encryption information, by using at least one of an attribute-based encryption method, an identification-based encryption method, and a certificate-less authenticated encryption method.

For example, the parking zone management device 20 may generate the first encryption information, by encrypting part or all of the information about the vehicle (e.g., part or all of the information about the number of the vehicle, the information about the manufacturer of the vehicle, and/or the information about the model of the vehicle), by using the wireless identification information and information about a parking area assigned to the vehicle as an encryption key.

According to an embodiment, the parking zone management device 20 may generate the first encryption information, by further using position information of the vehicle in addition to the information about the vehicle and the wireless identification information. In this case, the position information of the vehicle may include information about a current position of the vehicle or a position of the parking zone. For example, when the first vehicle tries to enter an OO mart parking lot, position information of the first vehicle may be the OO mart parking lot and OO mart coordinates.

For example, the parking zone management device 20 may generate the first encryption information, by encrypting the information about the vehicle (e.g., at least one of the information about the number of the vehicle, the information about the manufacturer of the vehicle, and the information about the model of the vehicle) and the position information of the vehicle, by using the wireless identification information as an encryption key.

According to an embodiment, the parking zone management device 20 may store the first encryption information in a memory, or may store the first encryption information in the server device 30. When the first encryption information is to be stored in the server device 30, the parking zone management device 20 may transmit the first encryption information to the server device 30 connected to the parking zone management device 20.

According to an embodiment, when encryption information is not normally generated, the parking zone management device 20 may not assign a parking area to the vehicle, and may obtain again the information about the vehicle. For example, the parking zone management device 20 may capture again the exterior image of the vehicle, or may request again the mobile terminal 11 in the vehicle again for the wireless identification information.

For example, when a number plate of the vehicle is damaged, there is no manufacturer symbol, or the mobile terminal 11 does not transmit the wireless identification information, a parking area may not be assigned to the vehicle.

In operation S240, the parking zone management device 20 may transmit the information about the parking area assigned to the vehicle to the mobile terminal 11. According to an embodiment, when the parking zone management device 20 obtains the first encryption information, the parking zone management device 20 may assign the parking area to the vehicle, and may transmit the information about the assigned parking area to the mobile terminal 11. The term "parking area" may refer to a space where each vehicle may substantially park. Hereinafter, for convenience of explanation, the parking area assigned to the vehicle may be referred to as a parking space/slot.

According to an embodiment, the parking zone management device 20 may transmit the information about the parking area assigned to the vehicle to the mobile terminal 11 by using short-range communication. For example, the parking zone management device 20 may transmit the information about the parking area assigned to the vehicle to the mobile terminal 11 by using NFC, Bluetooth, or Wi-Fi. The information about the parking area assigned to the vehicle may include, but is not limited to, an identifier of the parking area, an image of the parking area, and a map of the parking area.

According to another embodiment, the parking zone management device 20 may transmit the information about the parking area assigned to the vehicle to the mobile terminal 11 through the server device 30. In this case, the mobile terminal 11 may display the information about the parking area assigned to the vehicle through a parking management application.

When the parking zone management device 20 transmits the information about the parking area assigned to the vehicle to the mobile terminal 11, the parking area (parking space/slot) assigned to the vehicle is displayed on the mobile terminal 11, and thus the vehicle does not need to travel around the parking zone in order to find an empty parking area.

Referring to 310 of FIG. 3, when the parking area assigned to the vehicle is E212, the mobile terminal 11 may output a message indicating that the assigned parking area is E212. Although not shown in FIG. 3, the mobile terminal 11 may output the information about the parking area by voice.

According to an embodiment, the parking zone management device 20 may transmit, to the mobile terminal 11, information about a movement path from the current position of the vehicle to the parking area assigned to the vehicle. In this case, the mobile terminal 11 may display the movement path from the current position of the vehicle to the parking area assigned to the vehicle. For example, referring to 320 of FIG. 3, when the parking area assigned to the vehicle is E212, the mobile terminal 11 may show the movement path from the current position (i.e., a parking lot entry) to E212 by using an arrow. In this case, a driver may check the movement path, and may quickly move the vehicle to the assigned parking area.

When the vehicle is an autonomous vehicle, the parking zone management device 20 may transmit the information about the movement path from the current position of the vehicle to the parking area assigned to the vehicle to the autonomous vehicle.

In operation S250, the parking zone management device 20 may control a blocker to cause the vehicle to move to the parking area.

According to an embodiment, the parking zone management device 20 may allow passage of the vehicle, by changing a position of the blocker from a first position to a second position. When the first encryption information is not normally obtained, the parking zone management device 20 may block passage of the vehicle, by maintaining the position of the blocker at the first position. There may be various methods, performed by the parking zone management device 20, of controlling the position or a shape of the blocker in order to allow passage of the vehicle.

An operation, performed by the parking zone management device 20, of managing passage of the vehicle trying to exit the parking zone will be described with reference to FIG. 4.

Figure 4:
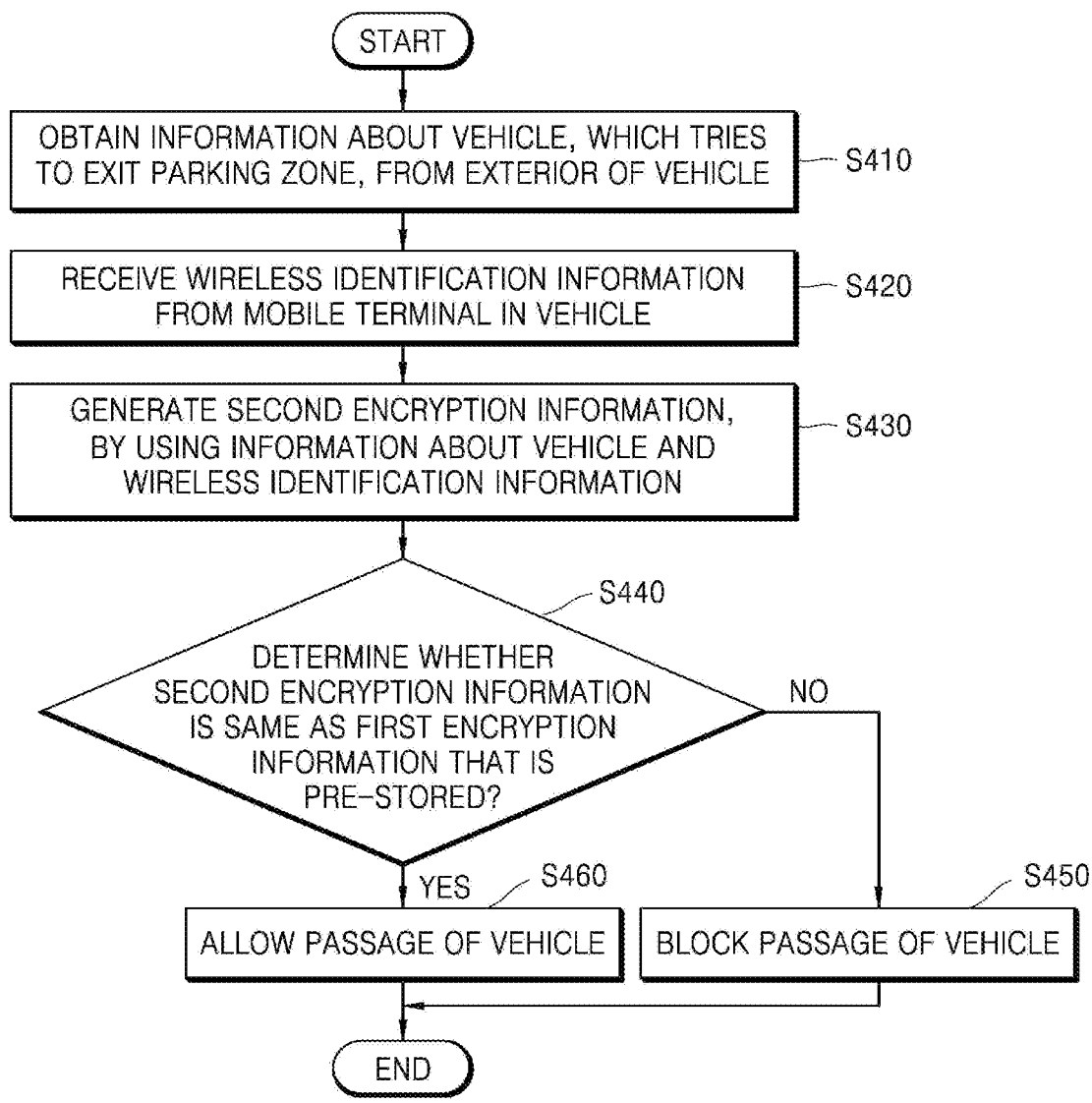
FIG. 4 is a flowchart for describing a parking zone management method related to passage of a vehicle that is to exit according to an embodiment.

FIG. 4 is a flowchart for describing a parking zone management method related to passage of a vehicle that is to exit according to an embodiment.

In operation S410, the parking zone management device 20 may obtain information about a vehicle, which tries to exit a parking zone, from the exterior of the vehicle. For example, the parking zone management device 20 may capture an image of the exterior of the vehicle trying to exit the parking zone, and may obtain at least one of information about a number of the vehicle, information about a manufacturer (e.g., a company or an organization) of the vehicle, and information about a model of the vehicle from the captured image.

According to another embodiment, the parking zone management device 20 may receive the information about the vehicle from the vehicle through the communicator 23. For example, the vehicle may broadcast or advertise a packet including a vehicle number and a vehicle manufacturer in a predetermined cycle by using V2X (e.g., DSRC (Dedicated short-range communications) or WAVE (Wireless Access in Vehicular Environments)). In this case, the parking zone management device 20 may obtain the vehicle number, the vehicle manufacturer, etc., by analyzing the packet.

Operation S410 corresponds to operation S210 of FIG. 2, and thus a detailed explanation thereof will not be given.

In operation S420, the parking zone management device 20 may receive wireless identification information from the mobile terminal 11 in the vehicle. For example, the wireless identification information may include, but is not limited to, NFC ID, Bluetooth ID, and a 2D barcode.

According to an embodiment, the parking zone management device 20 may receive the wireless identification information from the mobile terminal 11, by using various wireless communication technologies. For example, the parking zone management device 20 may receive, from the mobile terminal 11, the wireless identification information through one of, but not limited to, Bluetooth, BLE, Zigbee, Wi-Fi, RFID, and NFC.

According to an embodiment, the parking zone management device 20 may receive the wireless identification information that is broadcast in the mobile terminal 11 in the vehicle. Alternatively, the parking zone management device 20 may request the mobile terminal 11 in the vehicle for the wireless identification information and may receive the wireless identification information from the mobile terminal 11 in the vehicle.

In operation S430, the parking zone management device 20 may generate second encryption information, by using the information about the vehicle and the wireless identification information.

According to an embodiment, the parking zone management device 20 may generate the second encryption information, by using the same encryption algorithm as that used to generate first encryption information. For example, when the first encryption information is generated by using an identification-based encryption method from among an attribute-based encryption method, the identification-based encryption method, and a certificate-less authenticated encryption method, the parking zone management device 20 may generate the second encryption method by using the identification-based encryption method.

Also, the parking zone management device 20 may generate the second encryption information by using the same type of information as that used to generate the first encryption information. For example, when the parking zone management device 20 generates the first encryption information corresponding to the vehicle entering the parking zone by encrypting the information about the number of the vehicle, the information about the manufacturer of the vehicle, and position information of the vehicle by using the wireless identification information as an encryption key, the parking zone management device 20 may generate the second encryption information corresponding to the vehicle exiting the parking zone by encrypting the information about the number of the vehicle, the information about the manufacturer of the vehicle, and the position information of the vehicle by using the wireless identification information as an encryption key. Operation S430 corresponds to operation S230 of FIG. 2, and thus a detailed explanation thereof will not be given.

In operation S440, the parking zone management device 20 may compare the second encryption information with the first encryption information that is pre-stored.

According to an embodiment, the parking zone management device 20 may check whether there exists encryption information (i.e., the first encryption information) matching the second encryption information in an encryption information list stored in a memory. Alternatively, when the first encryption information is matched to identification information of the vehicle and is stored, the parking zone management device 20 may extract the first encryption information that is matched to the identification information of the vehicle and is stored from the memory, and may determine whether the extracted first encryption information matches the second encryption information.

According to another embodiment, the parking zone management device 20 may transmit the second encryption information to the server device 30, and may request the server device 30 to verify the second encryption information. In this case, the server device 30 may check whether there exists encryption information (i.e., the first encryption information) matching the second encryption information in an encryption information list stored in a database, and may transmit a checking result to the parking zone management device 20. Alternatively, the server device 30 may receive the identification information of the vehicle along with a verification request for the second encryption information, and may extract the first encryption information corresponding to the identification information of the vehicle from the encryption information list. The server device 30 may determine whether the extracted first encryption information matches the second encryption information, and may transmit a determination result to the parking zone management device 20.

In operation S450, when a similarity between the second encryption information and the first encryption information that is pre-stored is less than a threshold value, the parking zone management device 20 may block passage of the vehicle.

For example, when the mobile terminal 11 in the vehicle is changed from a first mobile terminal to a second mobile terminal, first wireless identification information received from the first mobile terminal may be different from second wireless identification information received from the second mobile terminal. Also, the first encryption information generated by using the first wireless identification information and the second encryption information generated by using the second wireless identification information may be different from each other. Accordingly, because the first encryption information that is pre-stored does not match the second encryption information, the parking zone management device 20 may prevent the vehicle from exiting the parking zone, by controlling a position of a blocker.

In operation S460, when the similarity between the second encryption information and the first encryption information that is pre-stored is equal to or greater than the threshold value, the parking zone management device 20 may allow passage of the vehicle. For example, the parking zone management device 20 may allow the vehicle to exit the parking zone, by adjusting the position of the blocker from a first position to a second position. According to an embodiment, the parking zone management device 20 may determine a parking fee of the vehicle, based on an interval between a time when the first encryption information is generated and a time when the second encryption information is generated. When the determined parking fee is paid, the parking zone management device 20 may allow passage of the vehicle. In this case, the parking fee may be paid by using any of various methods such as cash, a credit card, payment using the mobile terminal 11, or a wire transfer.

Accordingly, according to an embodiment, a person who does not have the mobile terminal 11 may be prevented from stealing the vehicle.

When the mobile terminal 11 does not exist in the vehicle, the parking zone management device 20 may not transmit information about an assigned parking area to the mobile terminal 11. In this case, the parking zone management device 20 may issue a paper parking ticket. For example, when the mobile terminal 11 that may transmit the wireless identification information does not exist in a first vehicle, the parking zone management device 20 may issue the paper parking ticket including information about a parking area assigned to the first vehicle and a 2D barcode (e.g., a quick response (QR) code). In this case, the 2D barcode may include information (e.g., the first encryption information) in which part or all of information about the first vehicle is encrypted. For example, the parking zone management device 20 may encrypt information about a number of the first vehicle and position information of the first vehicle, by using the information about the assigned parking area as an encryption key. The parking zone management device 20 may generate the 2D barcode by using the encrypted information (e.g., the first encryption information).

When the first vehicle tries to exit the parking zone, the parking zone management device 20 may generate the second encryption information, by encrypting the information about the number of the first vehicle and the position information of the first vehicle, by using the information about the assigned parking area as an encryption key. The parking zone management device 20 may obtain the first encryption information, by reading the 2D barcode included in the paper parking ticket.

When the first encryption information obtained by reading the 2D barcode included in the paper parking ticket matches the second encryption information, the parking zone management device 20 may allow the first vehicle to exit the parking zone, by adjusting the position of the blocker from the first position to the second position.

Although a method, performed by the parking zone management device 20 parked in the parking zone, of managing passage of the vehicle has been described with reference to FIGS. 2 through 4, the disclose is not limited thereto. According to an embodiment, the server device 30, instead of the parking zone management device 20, may manage passage of the vehicle entering or exiting the parking zone.

The parking zone access management system 1000 will be described in more detail with reference to FIGS. 5 through 7.

Figure 5:
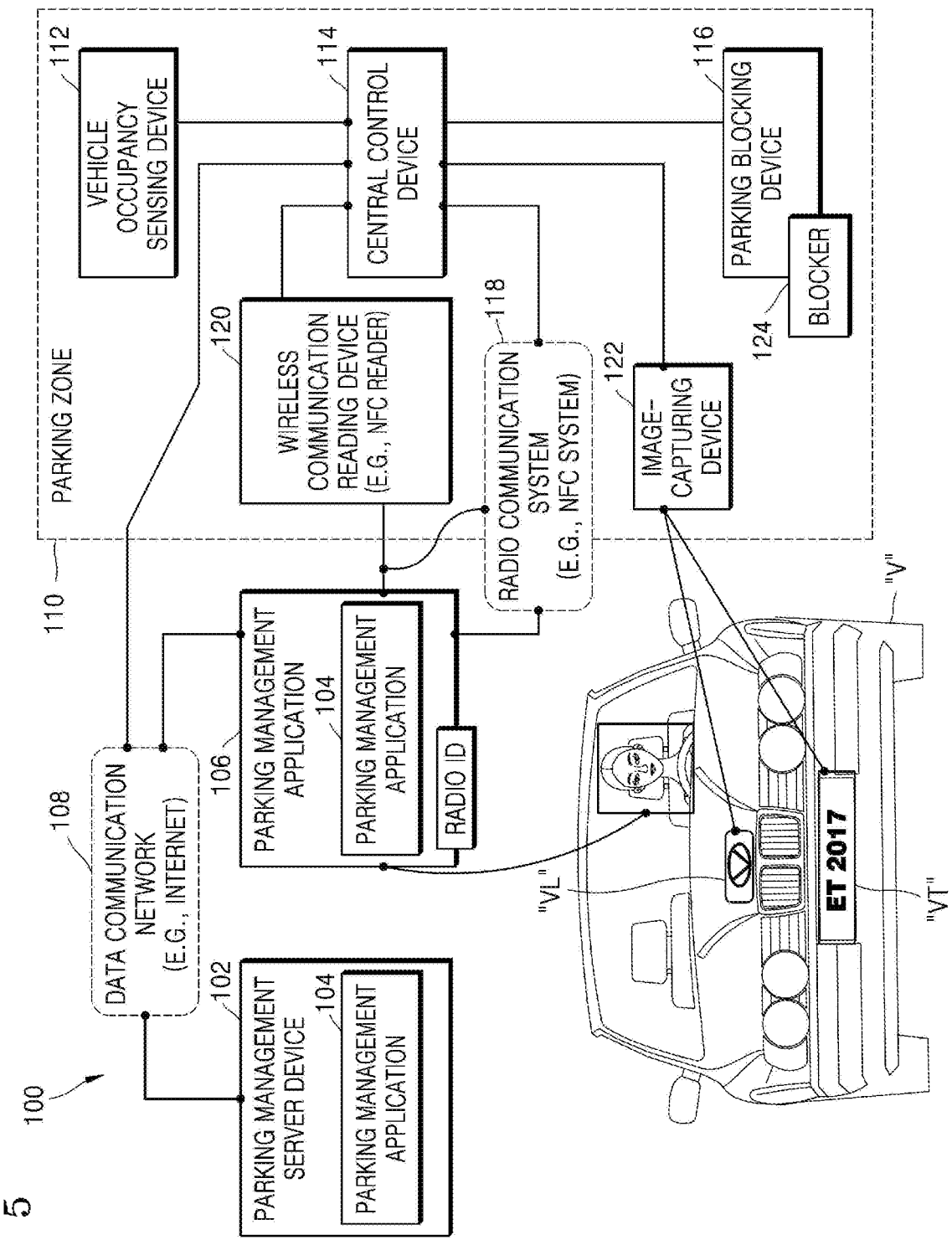
FIG. 5 is a block diagram of the parking zone access management system according to an embodiment.

FIG. 5 is a block diagram of the parking zone access management system 100 according to an embodiment. FIG. 6 is a diagram for describing the parking zone access management system 100 that manages entry to a parking zone according to an embodiment. FIG. 7 is a diagram for describing the parking zone access management system 100 that manages exit from a parking zone according to another embodiment.

Figure 6:
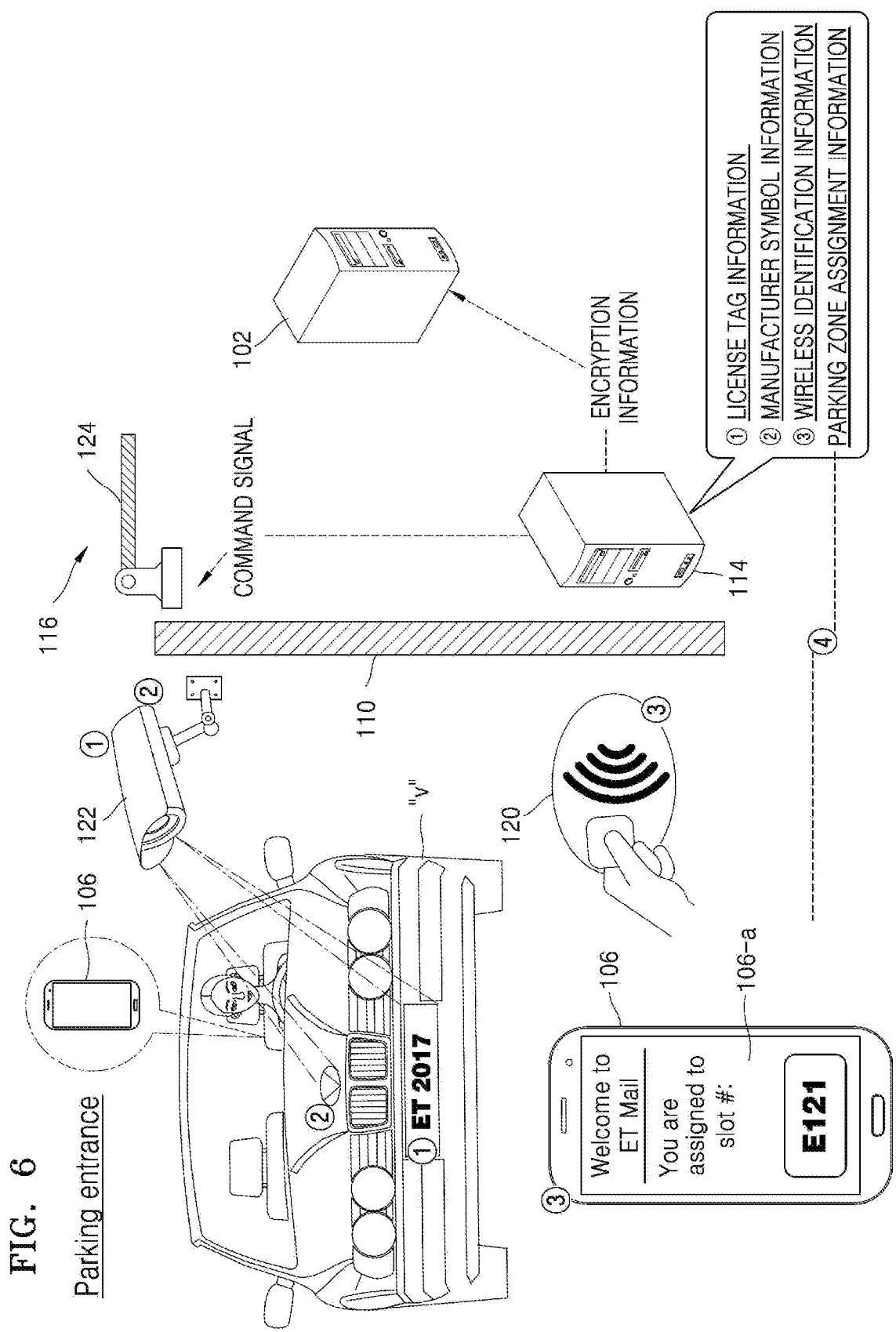
FIG. 6 is a diagram for describing the parking zone access management system that manages entry to a parking zone according to an embodiment.
Figure 7:
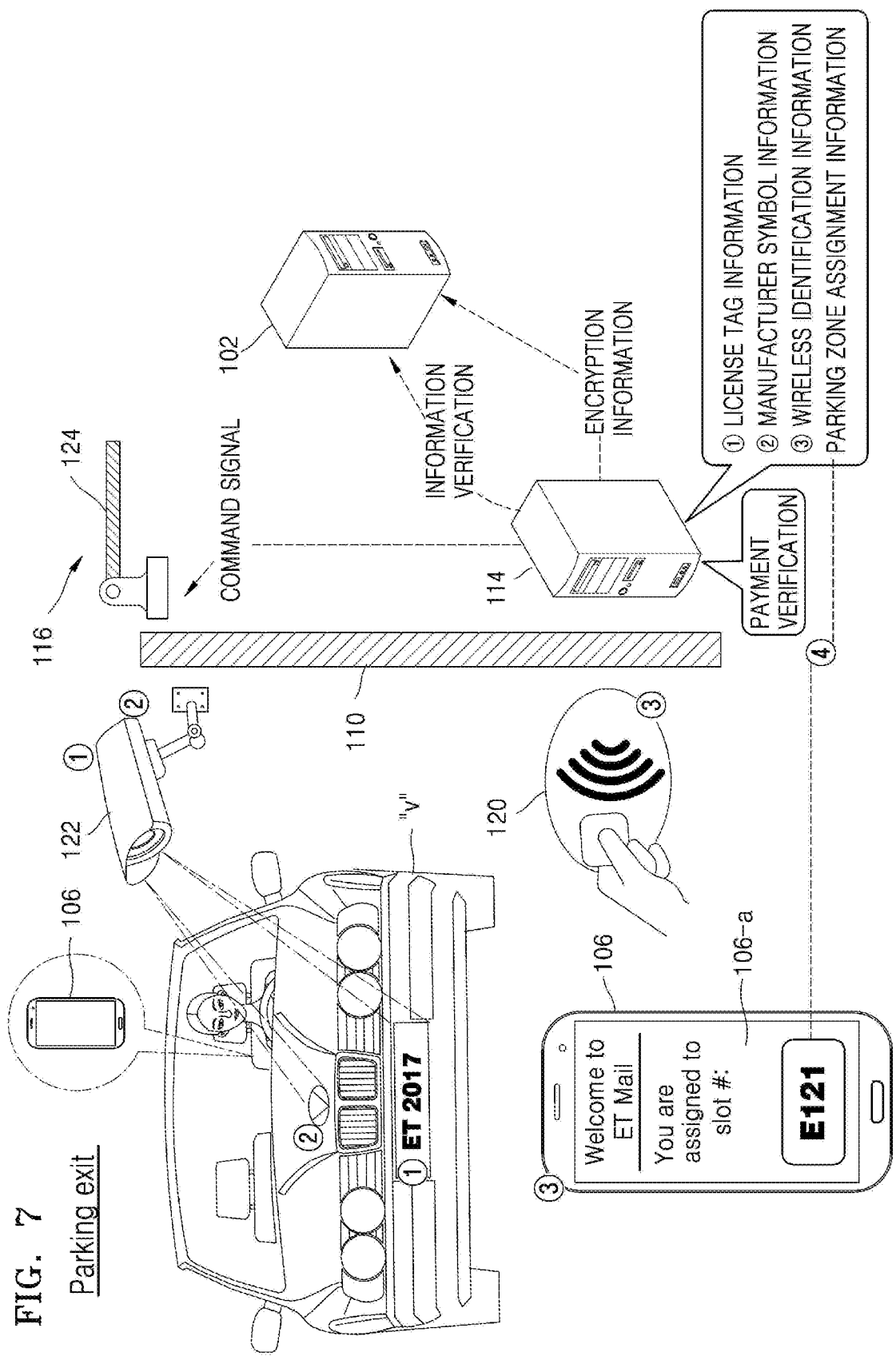
FIG. 7 is a diagram for describing the parking zone access management system that manages exit from a parking zone according to another embodiment.

Referring to FIGS. 5 through 7, the parking zone access management system 100 may include a parking management server device 102, an on-board communication device 106, and a central control device 114. The parking management server device 102 may correspond to the server device 30 of FIG. 1, the on-board communication device 106 may correspond to the mobile terminal 11 of FIG. 1, and the central control device 114 may correspond to the controller 22 of the parking zone management device 20. According to an embodiment, the parking management server device 102, the on-board communication device 106, and the central control device 114 may be connected to a data communication network 108. According to an embodiment, the parking management server device 102 may be a single server computer or a cluster of server computers connected to an appropriate communication network such as the Internet. The parking management server device 102 may be operated by a parking management service provider, and may provide a parking management application 104 or a computing service similar to the parking management application 104 to the on-board communication device 106. The single server computer or the cluster of server computers may include a software module that may receive and process one or more requests from the on-board communication device 106 through the data communication network 108. The server computer or the cluster of server computers may collect and store application records in a database, and may execute some or all of software programs of the present disclosure for performing various operations and functions.

According to an embodiment, the parking zone access management system 100 may include at least one parking blocking device 116, a wireless communication reading device 120, an image-capturing device 122, and a vehicle occupancy sensing device 112, and all of the elements may generally communicate with the central control device 114 and may be appropriately located in a parking zone 110 or a parking facility.

The term "parking zone 110" in the present specification may refer to a well-known physical place, facility, and/or structure designed to park various land vehicles such as middle-sized cars, trucks, excavators, and tractors. The parking zone 110 may also be designed to park watercraft, recreational vehicles, air vehicles, or space vehicles. The parking zone 110 may generally access, may be located around, or may be securely attached to a separate physical structure such as a residential, commercial, industrial, or governmental building. The term "parking space/slot" for storing a vehicle in the present specification may refer to a garage, an indoor parking place, an outdoor parking place, a privileged parking place, a valet parking place, a bay or street parking place, an open parking place, a underground parking place, an undercroft parking area, a multi-level parking structure, a hybrid elevated parking area, a non-movable parking structure, or a movable parking structure, and may be located in relation to the parking zone 110.

The "central control device 114" in the present specification may be an independent device, a distribution device, or a remotely operable device. The central control device 114 may operate to calculate and obtain data from other computing devices such as the parking management server device 102, the on-board communication device 106, and other parking hardware components and/or to transmit the data. The central control device 114 may be or include a micro-controller, a single central processing unit (CPU), a plurality of processing units, a digital signal processor (DSP), a single computing system, or a cluster of computing systems. The central control device 114 may include a communication module for wired or wireless communication.

According to an embodiment, the central control device 114 may be located in relation to the parking zone 110 for at least one vehicle "V" having a license tag "VT", a vehicle manufacturer symbol "VL", and the on-board communication device 106. The on-board communication device 106 may provide wireless identification information read through a radio communication system 118.

The "on-board communication device 106" in the present specification may be a wireless mobile or non-mobile data communication device such as a smartphone, a mobile phone, a PDA, a tablet device, a phablet device, a desktop computer, or a laptop computer. The on-board communication device 106 may render a parking management application on a user interface from the parking management server device 102 connected to the data communication network 108. The on-board communication device 106 may be used in order for a human client to receive parking-related information such as parking zone assignment information. The on-board communication device 106 may access a parking zone reservation/assignment service that may be related to the parking management application.

The "parking blocking device 116" in the present specification may be a device including a blocker 124 (physical blocker) that may operate (e.g., be raised or lowered) so that only a permitted vehicle accesses a given parking space. As well known in the related art, the blocker 124 may have a strong body pivotably mounted on a base structure firmly attached to a rigid support structure such as the ground, a cement structure, a concrete slab, a mesh, a frame structure concrete retaining wall, a building wall, a concrete column, or a reinforced concrete column. According to an embodiment, the parking blocking device 116 may be mechanized, collapsible, rolled up, rolled down, rolled sideways, an operable bollard, retractable, or foldable.

The "vehicle occupancy sensing device 112" in the present specification may be a sensing mechanism for determining whether the given parking space is occupied or unoccupied/empty. As well known in the related art, a sensing means may be or include a load sensing device such as a proximity switch, a pressure switch, a mechanical load weight switch, a mechanical relay, or an optical switch. The sensing means may be or include a potentiometer, a proximity sensing device, an infrared sensing device, a speed sensing device, a movement sensing device, a magnetism-based sensing device, a contact sensing device, an ultrasound sensing device, a capacitive sensing device, a hall-effect sensing device, or an inductive sensing device. One of the above devices may be used as the vehicle occupancy sensing device 112. Alternatively, an appropriate combination of the above devices may be used as the vehicle occupancy sensing device 112.

The parking blocking device 116 appropriately located in the parking zone 110 may include at least one blocker 124 that is movable between a first blocking position and a second blocking position. The first blocking position of the blocker 124 prevents passage of the vehicle "V" through the blocker 124. The second blocking position of the blocker 124 allows passage of the vehicle "V" through the blocker 124. According to an embodiment, an additional blocking position or many blocking positions may be required to effectively prevent or allow movement of the vehicle "V" passing through the blocker 124 according to a configuration of the parking blocking device 116. According to an embodiment, the parking blocking device 116 may be connected to the central control device 114 for data communication. In this case, the parking blocking device 116 may cause the blocker 124 to move between the first blocking position and the second blocking position according to a control command signal from the central control device 114. The wireless communication reading device 120 appropriately located in the parking zone 110 may wirelessly communicate with the on-board communication device 106. In this case, the wireless communication reading device 120 may obtain the wireless identification information from the on-board communication device 106 through the radio communication system 118. Also, the wireless communication reading device 120 may be connected to the central control device 114 for data communication. In this case, the wireless communication reading device 120 may transmit the wireless identification information to the central control device 114 through an appropriate transmission link, hardware, and a circuit which are well known in the art.

The image-capturing device 122 located in the parking zone 110 may be connected to the central control device 114 for data communication. In this case, the image-capturing device 122 may capture one or more images of the vehicle manufacturer symbol "VL" of the vehicle "V" as well as one or more images of the license tag "VT" and may transmit the captured images to the central control device 114 through the appropriate transmission link, the hardware, and the circuit which are well known in the art.

The central control device 114 may be located to perform a computer-executable operation of generating license tag information and manufacturer symbol information from the captured images of the license tag "VT" and the vehicle manufacturer symbol "VL". The generating of the license tag information by the central control device 114 may include performing an OCR operation on images captured by the central control device 114 or the images of the license tag "VT". The generating of the manufacturer symbol information by the central control device 114 includes performing image processing on the images captured by the central control device 114 or the images of the vehicle manufacturer symbol "VL". The performing of the image processing includes using various frameworks such as filtering, segmentation, image restoration, convolution, feature extraction, background subtraction, edge detection, object recognition, morphological image analysis, and Euclidean distance transform (EDT) through image triangulation. The central control device 114 may generate parking zone reservation or assignment information in relation to the license tag information, the manufacturer symbol information, and the wireless identification information. The parking zone reservation or assignment information may be referred to as parking zone assignment information for convenience of explanation. The parking zone assignment information may be information indicating an available parking space or parking slot in the parking zone 110. Availability of a parking space or a parking slot may be detected by the vehicle occupancy sensing device 112. Alternatively, availability of a parking space or slot may be determined by the central control device 114 independently, or may be determined even when there is no vehicle occupancy sensing device 112. The independent determining of the availability of the parking space or slot may be performed when the central control device 114 maintains a database of all parking spaces or slots in the parking zone 110 and automatically updates a database of each parking space or slot assigned to the vehicle "V" or each parking space or slot which is vacated by the vehicle "V".

Also, the central control device 114 may encrypt part or a combination of the license tag information transmitted from the image-capturing device 122, the manufacturer symbol information transmitted from the image-capturing device 122, the wireless identification information transmitted from the wireless communication reading device 120, and the generated parking zone assignment information. The encrypting of the part or the combination of the license tag information, the manufacturer symbol information, the wireless identification information, and the parking zone assignment information may be performed when the central control device 114 performs one of attribute-based encryption, identification-based encryption, and certificate-less authenticated encryption.

The central control device 114 may (i) transmit the encrypted license tag information, manufacturer symbol information, wireless identification information, and parking zone assignment information to the parking management server device 102 through the data communication network 108; (ii) may configure the control command signal by using the parking zone reservation or assignment information; and (iii) may control the parking blocking device 116 to cause the blocker 124 to move between the first blocking position and the second blocking position based on the control command signal configured by the parking blocking device 116. For example, the control command signal may include an operation command for raising the blocker 124 from the first blocking position to the second blocking position so that the vehicle "V" entering the parking zone 110 travels to designated, reserved, or assigned parking zone assignment information (e.g., a parking slot reference number) of the vehicle "V". For example, the control command signal may include an operation command for lowering the blocker 124 from the second blocking position to the first blocking position so that the vehicle "V" vacates the parking zone 110 from the assigned parking zone assignment information of the vehicle "V".

The "parking management application 104" in the present specification may refer to a computer software program for providing a service and content related to parking management and parking reservation and/or assignment to electronic devices. For example, the parking management application 104 may be a mobile application, or an application that is executable through the on-board communication device 106 such as a smartphone, or a tablet computer. A program that may constitute the parking management application 104 may be independent software, or a program or an element of programs that may be implemented as hardware, software, firmware and/or a cloud resource. In this case, the cloud resource may include one or more infrastructure stacks and one or more infrastructure components such as an application server, a file server, a domain name system (DNS) server, a directory server, a web server, a network server, a group server, a database server, and a batch server.

In some embodiments, the parking management application 104 may be hosted by the parking management server device 102, may remotely access the parking management server device 102, and may be programmed to provide the parking zone reservation/assignment service from among vehicle parking-related services. The parking management application 104 that provides the parking zone reservation/assignment service may remotely access the on-board communication device 106 from the parking management server device 102 through the data communication network 108 and may be rendered on the on-board communication device 106. The parking management application 104 may be developed or programmed by using a well-known programming language such as Java, Hypertext Preprocessor (PHP), Perl, Python, or Ruby.

According to an embodiment, the parking management application 104 that is a mobile application installable and executable in the on-board communication device 106 upon request from a human client or a user may be downloaded from the parking management server device 102 or an application market such as Google Play or Apple App Store. The parking management application 104 may be a web application operating in a web browser operably resident and/or stored in the on-board communication device 106. Part or all of content of the parking management application 104 may be synchronized between the parking management server device 102 and the on-board communication device 106 through the data communication network 108. Due to a function of the parking management application 104, various commands, features, parameters, functions, instructions, or requests may be transmitted between the parking management server device 102 and the on-board communication device 106 connected to the data communication network 108.

The parking zone reservation/assignment service according to various embodiments of the present disclosure may generate the control command signal for allowing the driver/user/client to access the parking space/slot of the parking zone 110 based on the availability of the parking space/slot of the parking zone 110. The parking zone reservation/assignment service may be performed by the central control device 114, and resultant parking zone reservation/assignment information may be first transmitted from the central control device 114 through the data communication network 108 to the parking management server device 102 and then may be transmitted from the parking management server device 102 through the data communication network 108 to the on-board communication device 106.

Also, the parking zone reservation/assignment information may be directly transmitted from the central control device 114 through an appropriate communication system such as the radio communication system 118 to the on-board communication device 106. According to some embodiments, the parking space/slot may be graphically displayed as text, a picture, an icon, a frame, or a video on a display screen or a user interface of the on-board communication device 106, through the parking management application 104.

In an embodiment, the parking management server device 102 may transmit the parking zone assignment information generated by the central control device 114 to the on-board communication device 106 through the data communication network 108. The parking management application 104 executed on the on-board communication device 106 may cause the parking zone reservation/assignment information transmitted through the data communication network 108 to be displayed as an electronic ticket or a parking ticket (acting as a paperless parking reservation or parking assignment ticket) on a display 106-a of the on-board communication device 106.

In another embodiment, the central control device 114 may be configured to transmit the parking zone reservation/assignment information to the on-board communication device 106 through the radio communication system 118. The parking management application 104 executed on the on-board communication device 106 may cause the parking zone reservation/assignment information transmitted through the radio communication system 118 to be displayed as an electronic ticket or a parking ticket (acting as a paperless parking reservation or parking assignment ticket) on the display 106-a of the on-board communication device 106.

The parking zone reservation/assignment service may include parking-related information such as a name of the parking zone 110 or facility, the number of available empty parking spaces/slots, location identification of an empty parking space/slot in the parking zone 110, a parking ratio or parking fee, online/offline geographical directions of one or more parking positions/spaces/slots, and a parking condition. The parking zone reservation/assignment service may be configured to be customized for each given parking zone 110 or facility.

The vehicle occupancy sensing device 112, the central control device 114, and the parking blocking device 116 may be located or arranged in the parking zone 110 by using various methods or various configurations. For example, the vehicle occupancy sensing device 112 may be operably connected to the central control device 114. The vehicle occupancy sensing device 112 may determine availability of at least one parking space/slot for the vehicle "V" in the parking zone 110, and may transmit the availability of the parking space/slot to the central control device 114. In some embodiments, each of the on-board communication device 106, the parking management server device 102, and the central control device 114 may be operably connected to the data communication network 108.

The parking blocking device 116 may be connected to the central control device 114 and/or may communicate with the central control device 114. According to an embodiment, according to a configuration of the parking zone 110, the central control device 114 may be physically separated from the parking blocking device 116, or may be physically coupled to the parking blocking device 116. The central control device 114 may be connected to the parking blocking device 116 through an appropriate physical link and/or circuit. In some embodiments, the central control device 114 may be located on an entry portion or an exit portion of the parking zone 110 or on both the entry portion and the exit portion.

When the parking blocking device 116 located in the parking zone 110 and communicating with the central control device 114 successfully receives and processes the control command signal configured by the central control device 114 from the central control device 114, the parking blocking device 116 may be controlled by the central control device 114 to allow passage of a vehicle to a parking space in the parking zone 110 through a vehicle access passageway.

In addition, or alternatively, when the parking blocking device 116 receives the control command signal from the on-board communication device 106 through the radio communication system 118, the parking blocking device 16 may be controlled by the central control device 114 to allow passage of the vehicle to the parking space in the parking zone 110 through the vehicle access passageway. This embodiment may be particularly suitable and/or applicable when the central control device 114 is physically connected to the parking blocking device 116.

The central control device 114 and the parking blocking device 116 may be physically connected by an attachable and/or mountable micro-component that may be a circuit board including a micro-controller, a micro-processor, an integrated circuit, or an electronic component, and each micro-component enables execution of pre-configured commands, communication with the vehicle occupancy sensing device 112, communication with the on-board communication device 106 through the radio communication system 118 that is an NFC system, and communication with the parking management server device 102 through the data communication network 108 that may be an IP-based network.

The control command signal may include at least one access code or code sequence that may be used to allow "access", "reservation", or "assignment" of a parking space formed by the user by using a means of the parking zone reservation/assignment service integrated into one of the parking management application 104 and the central control device 114. In an embodiment in which the parking reservation/assignment service is integrated into the parking management application 104, one or all of parking and/or vehicle-related information processed by the central control device 114 may be shared with the on-board communication device 106 through a data communication network by using the parking management application 104. Part or all of the access code related to the control command signal may be a temporary access code that may be set to automatically expire at a specific time or in response to a specific event.

In an embodiment, the control command signal including the at least one access code may be automatically transmitted from the central control device 114 to the parking management server device 102 right after "successful" reservation/assignment performed by the central control device 114. In this case, the parking management server device 102 may locally store, in a resident storage device, the access code included in the control command signal starting from the central control device 114.

The parking zone access management system 100 may be configured to monitor or track movement of the vehicle and/or states of parking zone reservation/assignment requests by using a database system related to the parking management server device 102 or a reservation/assignment tracking system, in certain embodiments. The tracking system may be a third-party proprietary system, may be generally available through the data communication network 108, and/or may be an apparatus using a satellite positioning system such as a global positioning system (GPS) that is a well-known system owned by the United States.

In some embodiments, the wireless identification information may be NFC identification information, the radio communication system 118 may be an NFC system, and the NFC identification information may be read through the NFC system. In an embodiment, the wireless communication reading device 120 may be referred to as an NFC reading device 120. The NFC reading device 120 may obtain the NFC identification information from the on-board communication device 106 through the NFC system.

Figure 8:
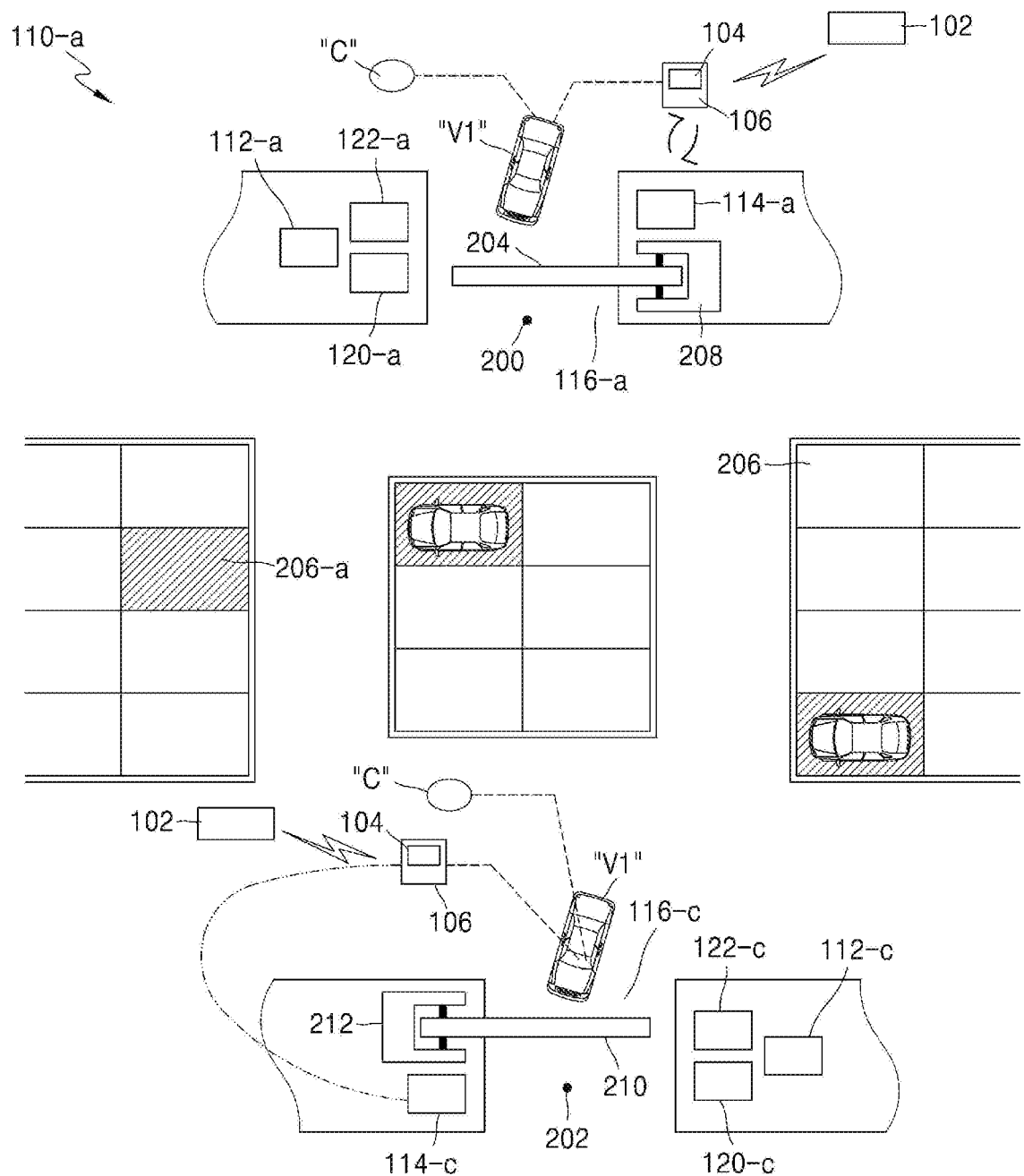
FIG. 8 is a diagram illustrating an arrangement of a parking zone to which the parking zone access management system is applicable according to an embodiment of the present disclosure.

FIG. 8 is a diagram illustrating a specific arrangement of a parking zone 110-*a* to which the parking zone access management system 100 is applicable according to an embodiment of the present disclosure. The parking zone 110-*a* includes a main entry or an entry passageway (ingress passageway) 200, a main exit or an exit passageway 202, and a plurality of parking spaces/slots 206. The parking spaces/slots 206 are located in the parking zone 110-*a* or a parking facility. The parking spaces/slots 206 may be located within and between the entry passageway 200 and the exit passageway 202 of the parking zone 110-*a*.

Access to the parking spaces/slots 206 in the parking zone 110-*a* may be controlled by using an entry parking blocking device 116-*a* that may communicate with an entry central control device 114-*a*. The entry parking blocking device 116-*a* is physically separated from the entry central control device 114-*a*. The entry parking blocking device 116-*a* and the entry central control device 114-*a* may be located adjacent to each other in an area surrounding the entry passageway 200 of the parking zone 110-*a*. The entry central control device 114-*a* may be located far from the entry parking blocking device 116-*a*. The entry central control device 114-*a* and the entry parking blocking device 116-*a* may communicate with each other by wire or wirelessly.

The entry parking blocking device 116-*a* may include an entry blocking arm or an entry "blocker" 204 pivotably mounted on an entry support base structure 208. The entry blocker 204 may correspond to the blocker 124 of FIG. 5. The entry blocker 204 of the entry parking blocking device 116-*a* may be raised by the entry central control device 114-*a* to a lifted position that is higher than a normal position substantially parallel to a ground surface. The normal position of the entry blocker 204 is a blocking position for preventing entry of a vehicle "V1" to the parking spaces/slots 206 through the entry passageway 200. The lifted position of the entry blocker 204 is a non-blocking position for allowing ingress or entry of the vehicle "V1" to the parking spaces/slots 206 through the entry passageway 200.

Exit from the parking spaces/slots 206 in the parking zone 110-*a* may be controlled by using an exit parking blocking device 116-*c* that may operably communicate with the exit central control device 114-*c*. The exit parking blocking device 116-*c* is physically separated from the exit central control device 114-*c*. The exit parking blocking device 116-*c* and the exit central control device 114-*c* may be located adjacent to each other in an area surrounding the exit passageway 202 of the parking zone 110-*a*.

According to an embodiment, the exit central control device 114-*c* may be located far from the exit parking blocking device 116-*c*. In this case, the exit central control device 114-*c* and the exit parking blocking device 116-*c* may communicate with each other by wire or wirelessly. Also, the entry central control device 114-*a* and the exit central control device 114-*c* that are physically separated from each other may form a single structure that may lead to both the entry and exit parking blocking devices 116-*a* and 116-*c* for allowing the vehicle "V1" to enter and exit the parking zone 110-*a*. In such a single arrangement of the entry and exit central control devices 114-*a* and 114-*c*, the entry and exit parking blocking devices 116-*a* and 116-*c* may perform network-based (e.g., local network-based) communication with the entry and exit central control devices 114-*a* and 114-*c*.

The exit parking blocking device 116-*c* may include an exit blocker 210 pivotably mounted on an exit support base structure 212. The exit blocker 210 may correspond to the blocker 124 of FIG. 5. The exit blocker 210 may be raised by the exit central control device 114-*c* to a lifted position that is higher than a normal position that is substantially parallel to the ground surface. The normal position of the exit blocker 210 is a blocking position for preventing egress (exit) of the vehicle "V1" from the parking spaces/slots 206 through the exit passageway 202. The lifted position of the exit blocker 210 is a non-blocking position for allowing egress or vacation of the vehicle "V1" from the parking spaces/slots 206 through the exit passageway 202.

During an operation, a parking visitor, a parking client, or a user "C" may reserve or obtain one parking space/slot 206 in the parking zone 110-*a* by using a parking zone reservation/assignment service of the entry central control device 114-*a*. To this end, the user "C" needs to operate an NFC interface of the on-board communication device 106, so that NFC identification information related to the on-board communication device 106 is read by an NFC reading device 120-*a* and then is transmitted from the NFC reading device 120-*a* to the entry central control device 114-*a*.

Next, or simultaneously, an image-capturing device 122-*a* may easily capture an image of the manufacturer symbol "VL" on an emblem or a logo of a manufacturer as well as an image of the license tag "VT" on a vehicle number plate. The captured images of the license tag "VT" and the manufacturer symbol VL may be transmitted from the image-capturing device 122-*a* to the central control device 114. All information related to and extracted and generated from the images by the central control device 114 as well as the NFC identification information may be considered as "identifiers", and may reside on the central control device 114 and may form a part of a reservation/assignment request to be processed through an executable reservation/assignment service from the central control device 114.

In response to the reservation/assignment request from the on-board communication device 106, the entry central control device 114-*a* may be automatically triggered to determine availability of one parking space or "parking slot 206" in the parking zone 110-*a*. The determination may be performed when one of the entry central control device 114-*a* and the exit central control device 114-*c* or the single structure of the entry central control device 114-*a* and the exit central control device 114-*c* communicates with the parking management server device 102 in the parking zone 110-*a* about the available parking space/slot 206.

The exit central control device 114-*c* may include, for example, data indicating the available parking space/slot 206 in the parking zone 110-*a*. The data indicating the available parking space/slot 206 in the parking zone 110-*a* may be shared by the exit central control device 114-*c* along with the parking management server device 102. The exit central control device 114-*c* may be connected to centralized vehicle occupancy sensing devices 112-*a* and 112-*c* that may be configured to obtain all data indicating the available parking space/slot 206 in the parking zone 110-*a*. In relation to entry and exit portions of the parking zone 110-*a*, the vehicle occupancy sensing device 112-*a* located at the entry portion of the parking zone 110-*a* may monitor the number of entering vehicles, and the vehicle occupancy sensing device 112-*c* located at the exit portion of the parking zone 110-*a* may monitor the number of exiting vehicles.

A process, performed by the centralized vehicle occupancy sensing devices 112-*a* and 112-*c*, of determining the number of the parking spaces/slots 206 that are available may be based on a total number of the parking spaces or "parking slots" 206 that are occupiable in the parking zone 110-*a*, a cumulative sum of vehicles entering the parking zone 110-*a* by passing through the entry passageway 200, and a cumulative sum of reservations or assignments monitored by the central control device 114 with respect to a total number of designated parking spaces/slots stored in a parking database of the central control device 114.

A preliminary parking space/slot 206-*a* may be considered to be successfully reserved and/or assigned when the following computer-executable operation is performed by the entry central control device 114-*a*: (i) an operation of generating parking zone assignment information in relation to the license tag "VT", the manufacturer symbol "VL", and wireless identification information; and (ii) an operation of encrypting part or a combination of license tag information and manufacturer symbol information transmitted from the image-capturing device 122-*a*, the wireless identification information transmitted from the wireless communication reading device 120-*a*, and the generated parking zone assignment information.

The generation of the parking zone assignment information and the encryption of part or all of information related to the parking zone assignment information may enable the entry central control device 114-*a* to perform operations of transmitting the encrypted license tag information, manufacturer symbol information, wireless identification information, and parking zone assignment information through the data communication network 108 to the parking management server device 102.

In response to the preliminary parking space/slot 206-*a* determined by the central control device 114, the parking zone reservation/assignment service provided by the central control device 114 may automatically generate and configure a control command signal by using the generated parking zone assignment information. In this case, the configured control command signal may be specific to the reservation/assignment request from the client "C", and the vehicle "V1" may access and enter the preliminary parking space/slot 206-*a* from among the parking spaces/slots 206 of the parking zone 110-*a*.

The generated control command signal may include a set of unique identifiers related to the vehicle "V1" used by the client, user, or driver "C" and the on-board communication device 106. The set of unique identifiers may include information such as a model, a model year, and a color in addition to a vehicle plate number and the manufacturer symbol information.

The unique identifiers related to the generated control command signal may also include parking zone reservation/assignment information such as a reservation fee (if any), a parking rate of the parking zone 110-*a*, a reservation/assignment time and date, and an arrival time and date of the vehicle "V1" at the parking zone 110-*a*.

At the exit portion of the parking zone 110-*a*, when the client "C" is to exit the parking zone 110-*a*, the client "C" may cause the on-board communication device 106 (e.g., an NFC system) to communicate with an exit wireless reading device 120-*c* communicating with the exit central control device 114-*c*, through the exit wireless reading device 120-*c*.

For example, when the vehicle "V1" tries to access the parking zone 110-*a*, as long as the on-board communication device 106 held by him or her is within a predetermined reading proximity distance (e.g., 5 meters) as specified by the exit wireless reading device 120-*c*, check-out of the vehicle "V1" may be triggered by the client C. When the vehicle V1 driven by the client C accesses the exit passageway 202 functioning as a vehicle access passageway from the parking space/slot 206, the exit wireless reading device (NFC reading device) 120-*c* may be triggered by the central control device 114 to communicate again with the on-board communication device 106 through the NFC system, and capture again images of the license tag "VT" and the manufacturer symbol "VL" of the vehicle "V".

The exit central control device 114-*c* may cause the vehicle V1 to exit or vacate the parking zone 110-*a*, by communicating with the exit parking blocking device 116-*c* so that the exit parking blocking device 116-*c* allows passage of the vehicle "V1" through the exit passageway 202. In one or more embodiments, the vehicle "V1" may exit or empty the parking zone 110-*a* after the central control device 114-*c* performs a series of payment-related steps or operations.

Before permission is given to the client C to exit the parking zone 110-*a* when the exit blocker 210 of the exit parking blocking device 116-*c* is raised from a normal blocking position, the exit central control device 114-*c* may determine a payment mode related to a parking zone reservation/assignment request.

For a payment transaction, a combination of the encrypted license tag information, manufacturer symbol information, wireless identification information, and parking zone assignment information may be verified by the central control device 114. Also, it may be determined whether the combination of the encrypted license tag information, manufacturer symbol information, wireless identification information, and parking zone assignment information is held or stored in the parking management server device 102. When the combination of the encrypted license tag information, manufacturer symbol information, wireless identification information, and parking zone assignment information is actually held or stored in the parking management server device 102, the parking managements server device 102 may transmit the verified combination of the encrypted license tag information, manufacturer symbol information, wireless identification information, and parking zone assignment information to the central control device 114. The verified combination of the encrypted license tag information, manufacturer symbol information, wireless identification information, and parking zone assignment information may be used in order for the central control device 114 to perform a payment processing operation. The payment processing operation based on the verified combination effectively ensures a secure payment-related transaction.

According to the payment mode, the client C having an intermediary account or a third party operated financial account registered to the parking management application 104 may pay in cash. The intermediary account may be appropriately replaced with a credit account, a dummy account, or a suspense account according to the classification of related withdrawal and/or credit recorded on general ledgers of one or more entities through the parking management application 104 running on the on-board communication device 106. In some embodiments, the financial account may be a payment or value exchange account, and examples of the value exchange account may include a cash card-based account, a credit card account, a debit card-based account, a check-based account, a prepaid card-based account, a point card-based account, a mileage-based account, and a gift check-based account. The identity of the client "C" may be authenticated, checked, and/or authorized to perform one or more electronic payment or value exchange transactions by using one or more of the above financial accounts.

The exit portion of the parking zone 110-*a* may be staffed to receive cash from the client "C" for a cash payment means. According to an embodiment, when a payment means related to the payment mode selected by the client "C" includes a third party process, the exit central control device 114-*c* may communicate with the third party processor, and may obtain a payment authorization signal related to reservation/assignment requested by the client "C" before entering the parking zone 110-*a*. When the payment authorization signal is generated, the central control device 114 may request or may not request the access code related to the control command signal that is previously used to access the parking space/slot 206 of the parking zone 110-*a*.

In some embodiments, the parking zone access management system 100 may include a type ticket printing device connected to the central control device 114 for data communication. In this case, the central control device 114 may generate a print command signal for printing the type ticket including the parking zone assignment information and may transmit the print command signal to the type ticket printing device.

Figure 9:
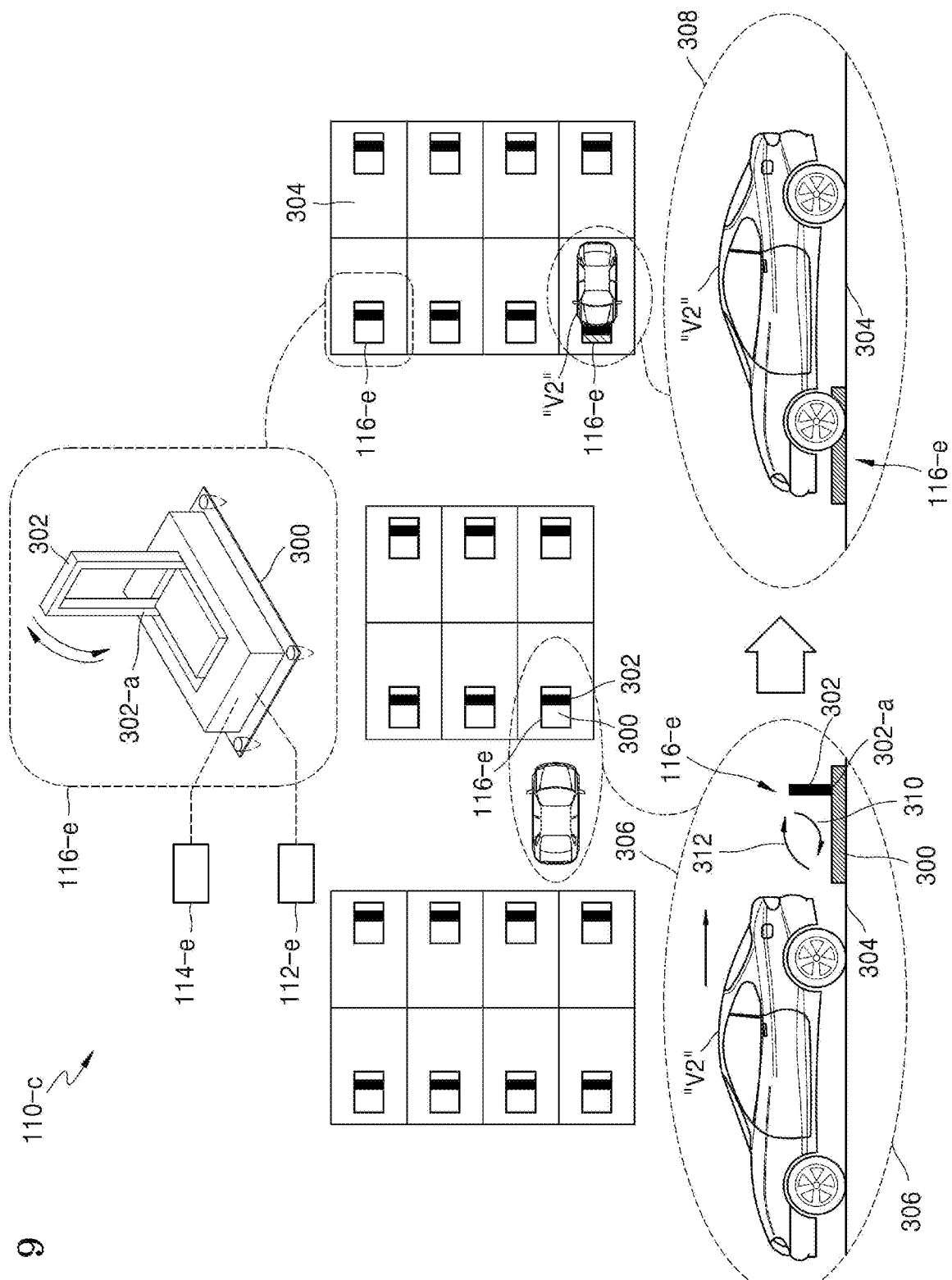
FIG. 9 is a diagram illustrating an alternative arrangement of a parking zone to which the parking zone access management system is applicable according to another embodiment.

FIG. 9 is a diagram illustrating an alternative arrangement of a parking zone to which the parking zone access management system 100 is applicable according to another embodiment of the present disclosure. A parking blocking device 116-*e* included in a parking zone 110-*c* may be of a parking bay blocking type. The parking blocking device 116-*e* may be bolted onto the ground for an open space parking arrangement, and thus it may be difficult to rob the parking blocking device 116-*e*. For a secure space parking arrangement, the parking blocking device 116-*e* that satisfies a predetermined weight requirement for maintaining stability may be left free-standing, and thus may be easily moved.

The parking blocking device 116-*e* may mainly include a base body 300 on which a blocker 302 whose end portion 302-*a* rotatably extends is provided. Referring to an enlarged view 306 of the parking zone 110-*c*, a lifted position of the blocker 302 on the base body 300 blocks passage of a vehicle "VT" through a vehicle access passageway to a parking space/slot 304 where the parking blocking device 116-*e* is safely installed. Referring to another enlarged view 308, a lowered position of the blocker 302 on the base body 300 may allow passage of the vehicle "V2" through the vehicle access passageway to the parking space/slot 304.

A plurality of the parking blocking devices 116-*e* may be located over an entire pre-determined parking portion of the parking zone 110-*c*. One parking blocking device 116-*e* may be fixedly installed in each parking space/slot 304 assigned to the parking zone. Each parking blocking device 116-*e* may include an embedded central control device 114-*e* and an embedded vehicle occupancy sensing device 112-*e* which may communicate with each other. In an embodiment, the vehicle occupancy sensing device 112-*e* may form an integrated portion of the central control device 114-*e*. The vehicle occupancy sensing device 112-*e* may be located in the parking zone 110-*c*.

As shown by the flow of an arrow path 310, through a well-known appropriate operation mechanism, the central control device 114-*e* may cause the blocker 302 to rotate about the end portion 302-*a* toward the base body 300 so that the vehicle "V2" is allowed to access the parking space/slot 304. As shown by the flow of an arrow path 312, the central control device 114-*e* may also cause the blocker 302 to rotate about the end portion 302-*a* away from the base body 300 so that the vehicle V2 is prevented from accessing the parking space/slot 304 in the parking zone 110-*c*.

Figure 10:
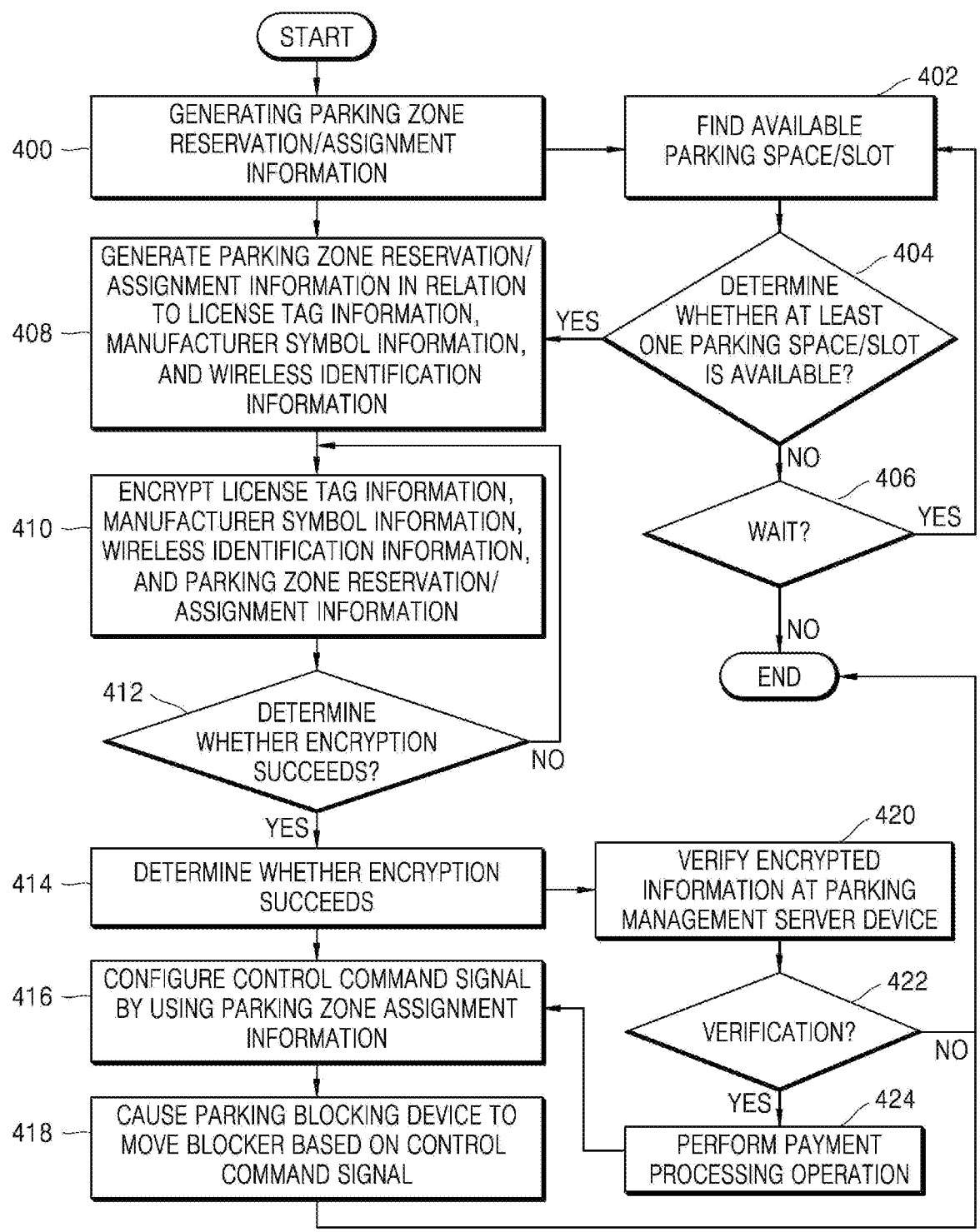
FIG. 10 is a flowchart for describing a parking zone reservation/assignment request service providing method of the parking zone access management system according to an embodiment.

FIG. 10 is a flowchart for describing a parking zone reservation/assignment service providing method of the parking zone access management system 100 according to an embodiment.

According to an embodiment, a parking zone reservation/assignment service may be performed by the central control device 114. The central control device 114 may include one or more computer clusters located to perform the parking zone reservation/assignment service which may include computer-executable instructions.

In operation 400, the central control device 114 may generate a parking zone (e.g., parking space/slot) reservation/assignment information that may be triggered by or from the on-board communication device 106 operated by a human client or user "C". According to an embodiment, parking zone reservation/assignment may be performed by using an electronic request that may include user selection information such as a name of the parking zone 110, 110-*a*, or 110-*c* and/or a specific position of the parking zone 110, an arrival time and date, and personal information of the user "C". A parking ratio determination method may also be based on a specific rule or regulation of one specific parking zone 110, 110-*a*, or 110-*c*, and may vary according to the one specific parking zone 110, 110-*a*, or 110-*c*.

In operation 402, the central control device 114 may automatically find the parking space/slot 206 or 304 that is available, in response to the parking zone reservation/assignment. The available parking space/slot 206 or 304 in the parking zone 110, 110-*a*, or 110-*c* may be determined by using any of various methods, for example, may be selected the user "C". However, the central control device 114 may communicate with the vehicle occupancy sensing device 112 in the selected parking zone 110, 110-*a*, or 110-*c*, and may obtain, from the central control devices 114, 114-*a*, 114-*c*, and 114-*e*, all information related to availability of the parking space/slot 206 or 304 in the selected parking zone 110, 110-*a*, or 110-*c*.

In operation 404, the central control device 114 may determine whether at least one parking space/slot 206 or 304 in the selected parking zone 110, 110-*a*, or 110-*c* may be occupied by the vehicle "V1" or "V2" of the user "C". When it is determined that there is no available parking space/slot, the central control device 114 may wait until the vehicle occupancy sensing device 112 transmits updated information about availability of the parking space/slot 206 or 304 in the selected parking zone 110, 110-*a*, or 110-*c*. When it is determined in operation 406 that the central control device 114 is to wait for the updated information, the central control device 114 may continue to search the selected parking zone 110, 110-*a*, or 110-*c* for the available parking space/slot, as shown in operation 402. When it is not determined in operation 406 that the central control device 114 is to wait for the updated information, a parking zone reservation/assignment service performed by the central control device 114 may end.

When it is determined in operation 404 that at least one available parking space/slot 206 or 304 exists, in operation 408, the central control device 114 may generate the parking zone reservation/assignment information in relation to license tag information, manufacturer symbol information, and wireless identification information.

In operation 404, the central control device 114 may encrypt the license tag information, the manufacturer symbol information, the wireless identification information, and the parking zone reservation/assignment information. When it is determined in operation 412 that the encryption fails, the process may return to operation 410. When the encryption succeeds, in operation 414, the central control device 114 may transmit the encrypted information to the parking management server device 102.

When the process of FIG. 10 is used for an entry portion of the parking zone 110, in operation 416, the central control device 114 may configure a control command signal by using the parking zone reservation/assignment information, and in operation 418, the central control device 114 may cause the parking blocking device 116 to move the blocker 124 or 208 from one position to another position based on the control command signal configured in operation 416.

When the process of FIG. 10 is used for an exit portion of the parking zone 110 where payment is required, in operation 420, the central control device 114 may transmit the encrypted information to the parking management server device 102 to verify the encrypted information. When it is determined in operation 422 that the encrypted information is not successfully verified, the process may end. When the encrypted information is verified, in operation 424, the central control device 114 may perform a payment processing operation.

The parking zone reservation/assignment service of FIG. 10 is merely an example, and various methods may be derived to provide any appropriate parking zone reservation/assignment service in accordance with an operation principle of the parking zone access management system 100. For example, a payment mode and a payment means may be determined based on what is required by each parking zone 110, 110-*a*, or 110-*c* or is pre-configured. Also, when a parking fee applied to the same parking zone is fixed, a payment transaction may be performed at the entry portion of the parking zone 110, 110-*a*, or 110-*c*.

Figure 11:
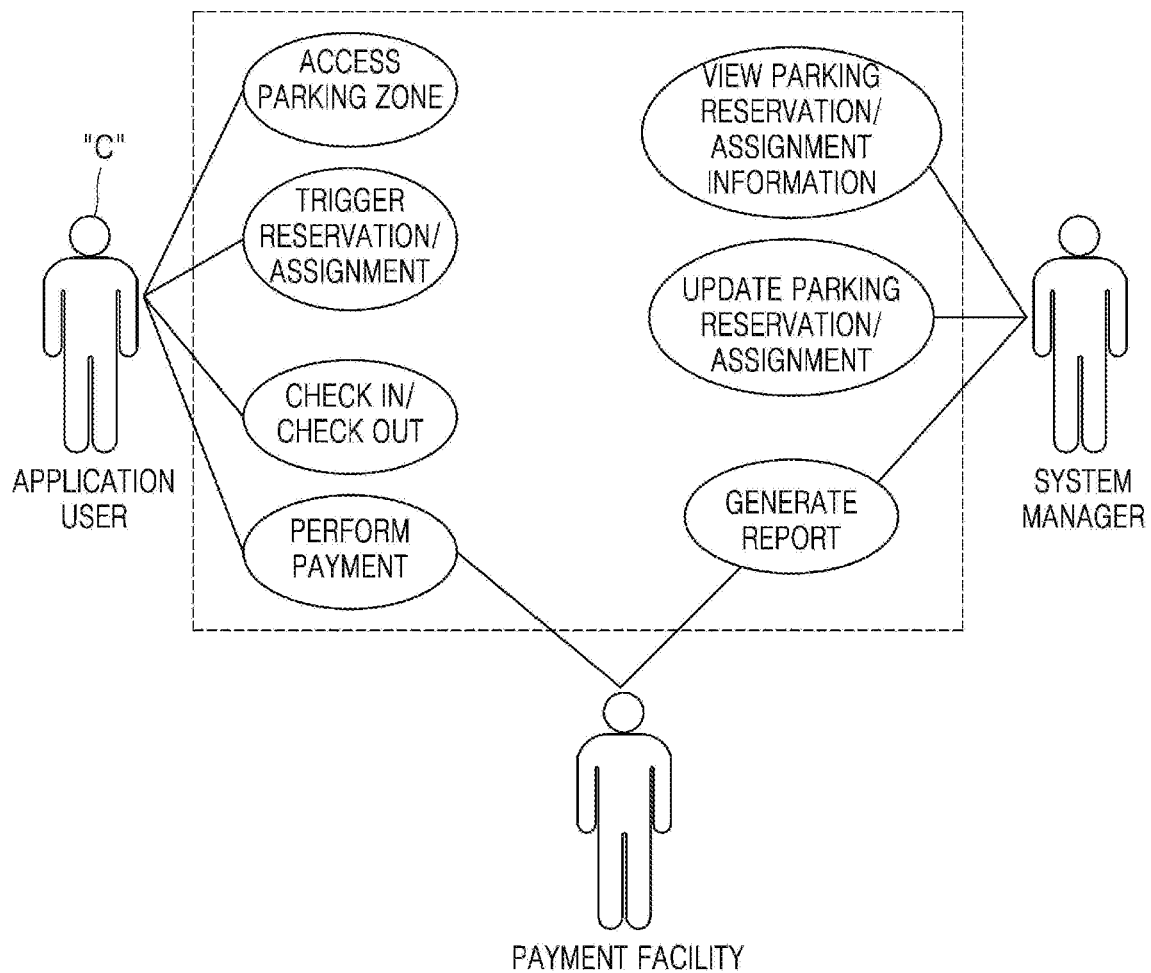
FIG. 11 is a usage case diagram illustrating an association between entities that may be related to the parking zone access management system according to one or more embodiments.

FIG. 11 is a usage case diagram illustrating an association between entities that may be related to the use of the parking zone access management system 100 according to one or more embodiments of the present disclosure. The usage case diagram of FIG. 11 may illustrate tasks of the entities in detail. For example, the usage case diagram of FIG. 11 illustrates how the entities use the parking zone access management system 100, which type of data and/or information may be generated through the parking zone access management system 100, and how elements, components, or parts of the parking zone access management system 100 are related to one another.

An application user "C" may perform various tasks, and the various tasks may include, but are not limited to, a task of accessing a specific parking zone, a task of triggering parking zone reservation/assignment, a task of performing check-in and check-out, and a task of starting/performing payment. A system manager of the parking zone 110, 110-a, or 110-c may perform various tasks including, but not limited to, a task of viewing parking reservation/assignment information, a task of updating parking reservation/assignment based on various parameters when there is information that needs to be manually adjusted due to an unavoidable system error, and a task of generating a report such as an accounting report.

A payment facility may process a payment operation that may include receiving a summary of a parking time spent in a given parking zone (e.g., 110, 110-a, or 110-c) or a parking facility, receiving an account statement and other information such as a promotion code and authorization acknowledgement, and checking payment validity. The task of updating the parking reservation/assignment may include checking an access or reservation request, checking validity, and editing parking reservation details, when deemed necessary by the system manager among others.

Figure 12:
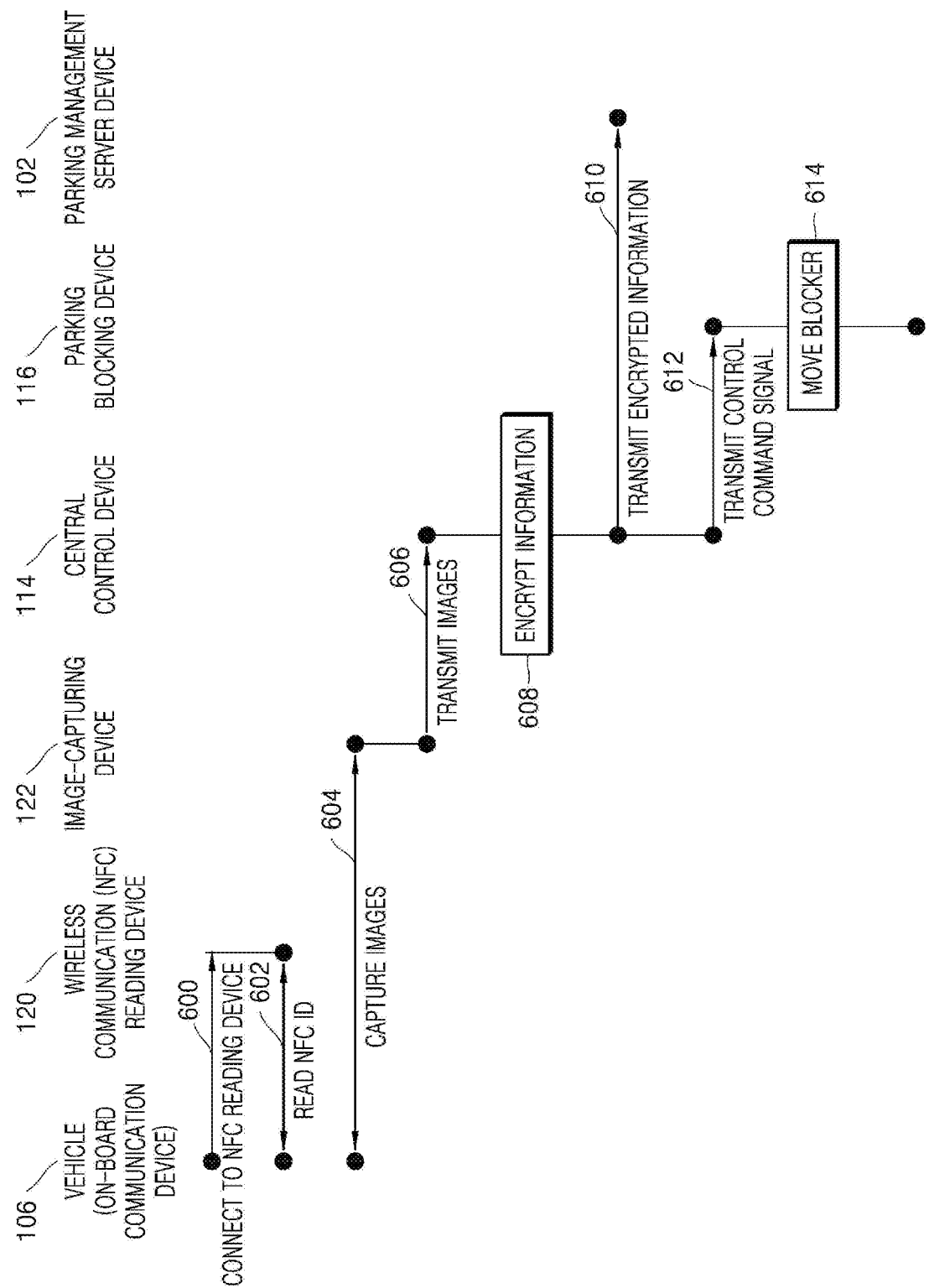
FIG. 12 is a process diagram illustrating a parking zone access management operation of the parking zone access management system according to an embodiment.

FIG. 12 is a process diagram illustrating a parking zone access management operation of the parking zone access management system 100 according to an embodiment. The parking zone access management operation of FIG. 12 may be performed at an entry portion of a given parking zone or a parking facility.

In operation 600, the on-board communication device 106 that is a vehicle-related on-board communication device may connect to the NFC reading device 120. In operation 602, the on-board communication device 106 may provide NFC identification information to the NFC reading device 120. Operations 600 and 602 may start when a vehicle approaches a parking zone or a parking facility. The NFC identification information read by the NFC reading device 120 may be automatically retrieved and processed by the central control device 114.

In operation 604, the image-capturing device 122 may capture images of the license tag "VT" and the vehicle manufacturer symbol "VL" of the vehicle "V". In operation 606, the image-capturing device 122 may transmit the captured images of the license tag "VT" and the vehicle manufacturer symbol "VL" of the vehicle V to the central control device 114. In operation 608, the central control device 114 may encrypt license tag information, manufacturer symbol information, NFC identification information, and generated parking zone reservation/assignment information. In operation 610, the encrypted information may be transmitted from the central control device 114 to the parking management server device 116.

In operation 612, a control command signal may be configured by the central control device 114 based on the parking reservation/assignment information generated in relation to the license tag information, the manufacturer symbol information, and the wireless identification information, and may be transmitted to the parking blocking device 116. In operation 614, in response to the configured control command signal, the parking blocking device 116 may move a blocker from one position to another position to prevent or allow passage of the vehicle through the blocker.

Figure 13:
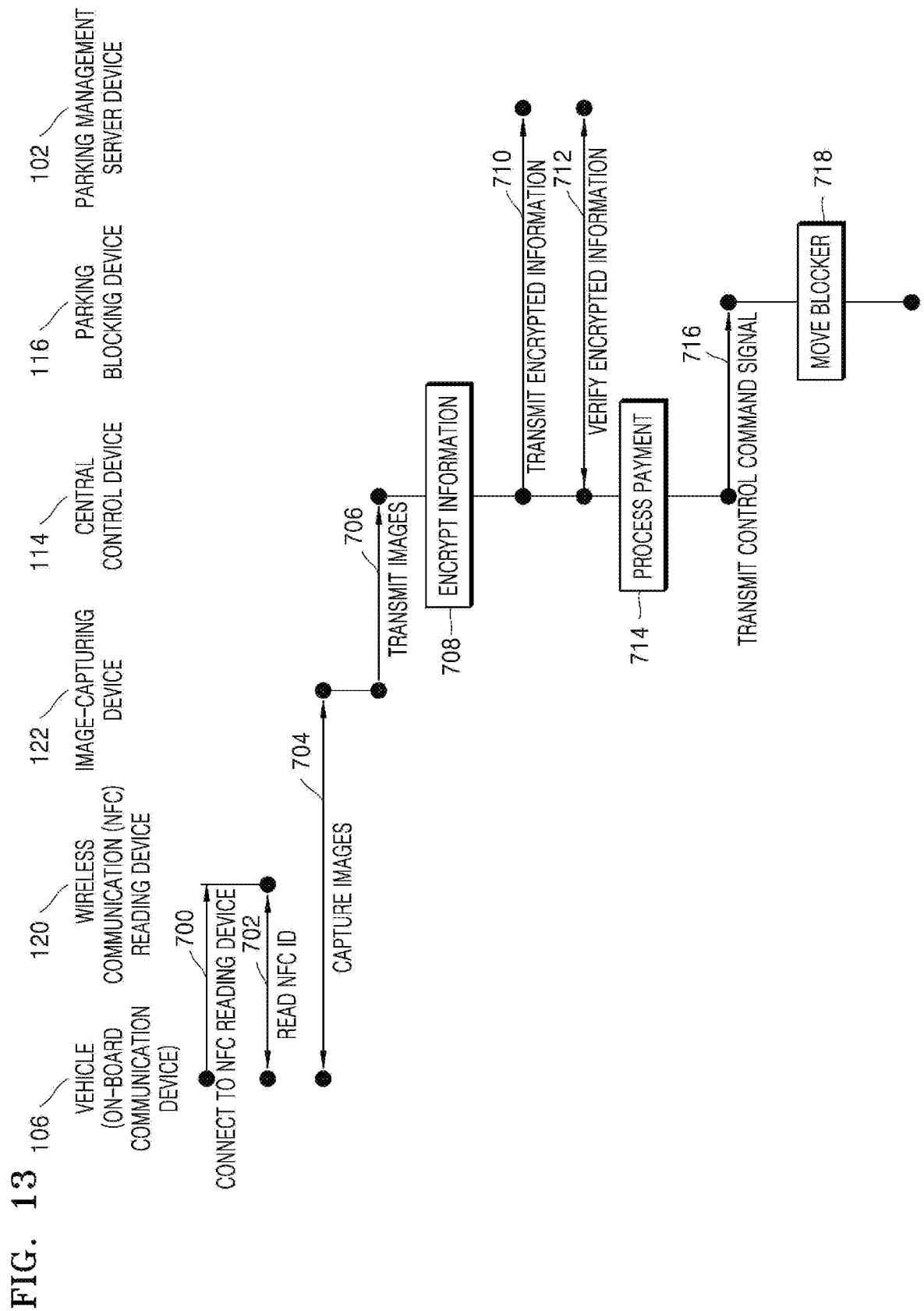
FIG. 13 is a process diagram illustrating a parking zone access management operation of the parking zone access management system according to another embodiment.

FIG. 13 is a process diagram illustrating a parking access management operation of the parking zone access management system 100 according to another embodiment. The parking zone access management operation of FIG. 13 may be performed at an exit portion of a predetermined parking zone or a parking facility.

In operation 700, the on-board communication device 106 that is a vehicle-related on-board communication device may connect to the NFC reading device 120. In operation 702, the on-board communication device 106 may provide NFC identification information to the NFC reading device 120. Operations 700 and 702 may start when a vehicle exits a parking zone or a parking facility. The NFC identification information read by the NFC reading device 120 may be automatically retrieved and processed by the central control device 114.

In operation 704, the image-capturing device 122 may capture images of the license tag "VT" and the vehicle manufacturer symbol "VL" of the vehicle "V". In operation 706, the image-capturing device may transmit the captured images of the license tag "VT" and the vehicle manufacturer symbol "VL" of the vehicle "V" to the central control device 114. In operation 708, the central control device 114 may encrypt license tag information, manufacturer symbol information, NFC identification information, and generated parking zone reservation/assignment information. In operation 710, the encrypted information may be transmitted from the central control device 114 to the parking management server device 116.

In operation 712, the central control device 114 may verify the encrypted information with the parking management server device 116, and in operation 714, the central control device 114 may process payment by performing an appropriate payment operation on the parking zone. In operation 716, a control command signal may be configured by the central control device 114 based on the license tag information, the manufacturer symbol information, and the wireless identification information, and may be transmitted to the parking blocking device 116. In operation 718, next, in response to the configured control command signal, the parking blocking device 116 may move a blocker from one position to another position to prevent or allow passage of the vehicle through the blocker.

Figure 14:
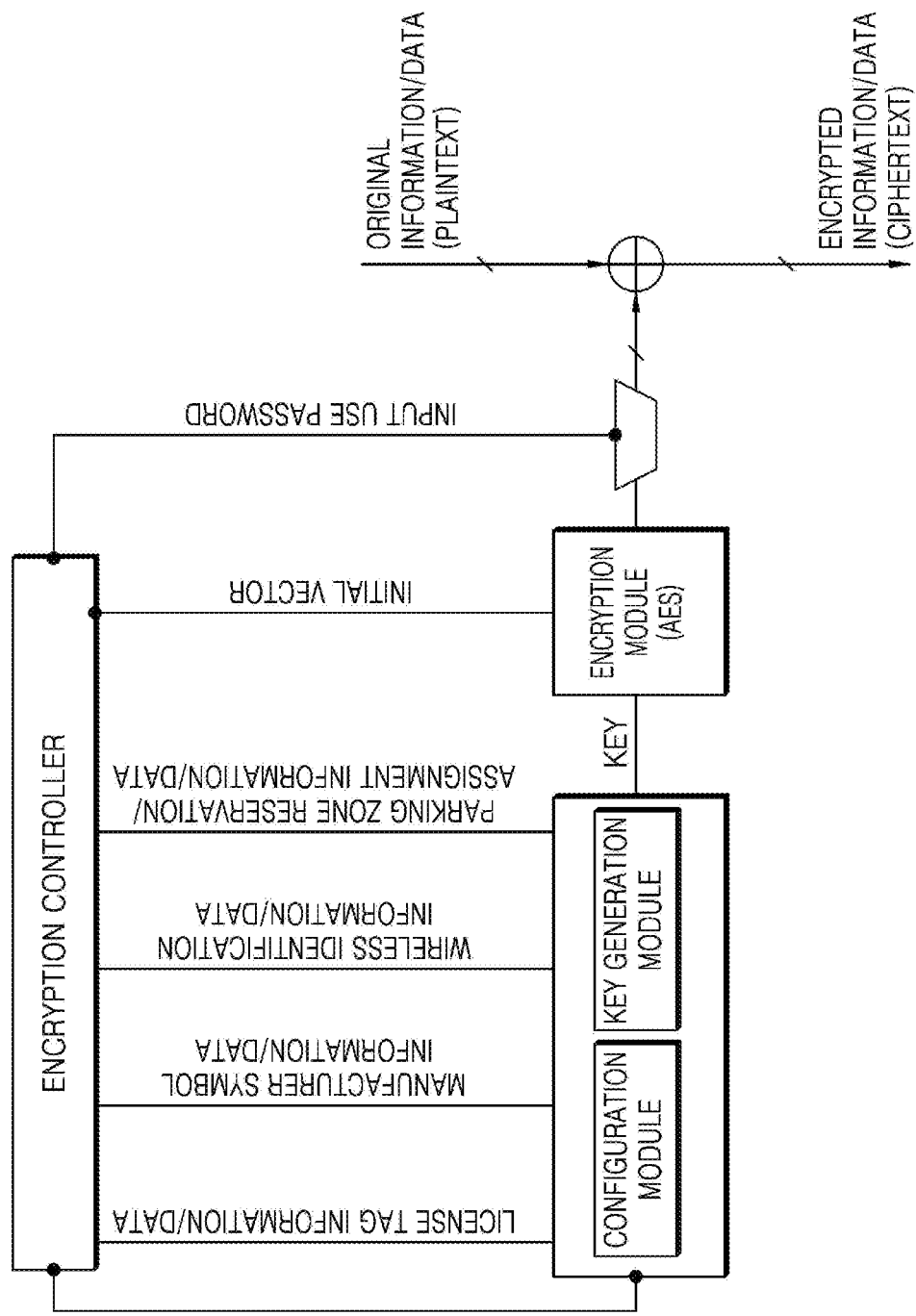
FIG. 14 is a block diagram illustrating an encryption routine according to one or more embodiments.

FIG. 14 is a block diagram illustrating an encryption routine according to one or more embodiments. The encryption routine of FIG. 14 is merely an example, and various encryption sequences and sequence parameters may be used in the parking zone access management system 100. The encryption sequences and the encryption parameters may be adjusted according to a scale of a parking operation related to a given parking facility, and may also be adjusted according to the preference and/or desired level of a protected data security or intensity.

As shown in FIG. 14, original vehicle-related information or plaintext related to license tag, manufacturer symbol, wireless identification, and parking zone reservation/assignment information may be converted and/or translated into encrypted information or ciphertext. An electronic signal and/or data corresponding to the original vehicle-related information that uniquely identifies a vehicle and physical characteristics of the vehicle may be processed by an encryption controller and then may be transmitted from the encryption controller to configuration and key generation modules.

The key generation module may receive signals and/or data corresponding to the original vehicle-related information along with various encryption sequences and related parameters as inputs from the encryption controller. The key generation module may generate a key for an encryption module (e.g., an advanced encryption standard (AES)-based encryption module). The key may be one of various sizes well known in the art, and may be a key suitable for a specific security level. The configuration module may monitor all keys generated for the encryption module.

Figure 15:
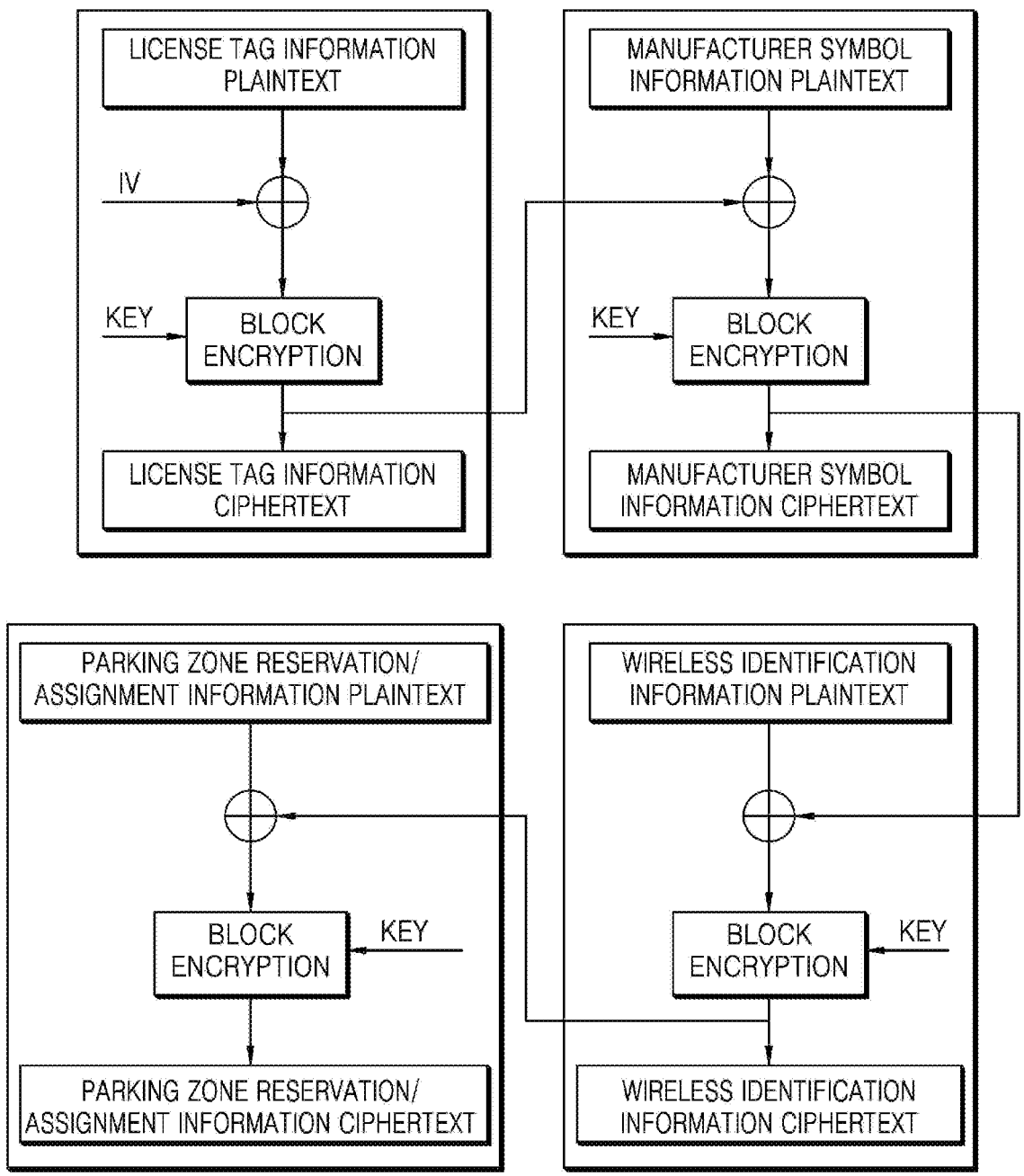
FIG. 15 is a block diagram illustrating another encryption routine according to one or more embodiments.

FIG. 15 is a block diagram illustrating another encryption routine according to one or more embodiments. The encryption routine of FIG. 15 may be characterized by, for example, a cipher block chaining (CBC) encryption mode. In the encryption routine of FIG. 15, a cipher key may be applied to blocks based on a cipher key applied to a single block in which a bit sequence is encrypted. Accordingly, a safe and reliable mechanism for protecting a signal and/or data indicating license tag, manufacturer symbol, wireless identification, and parking zone reservation/assignment information may be provided, and one block related to one of the above information is generally dependent on a preceding block.

Figure 16:
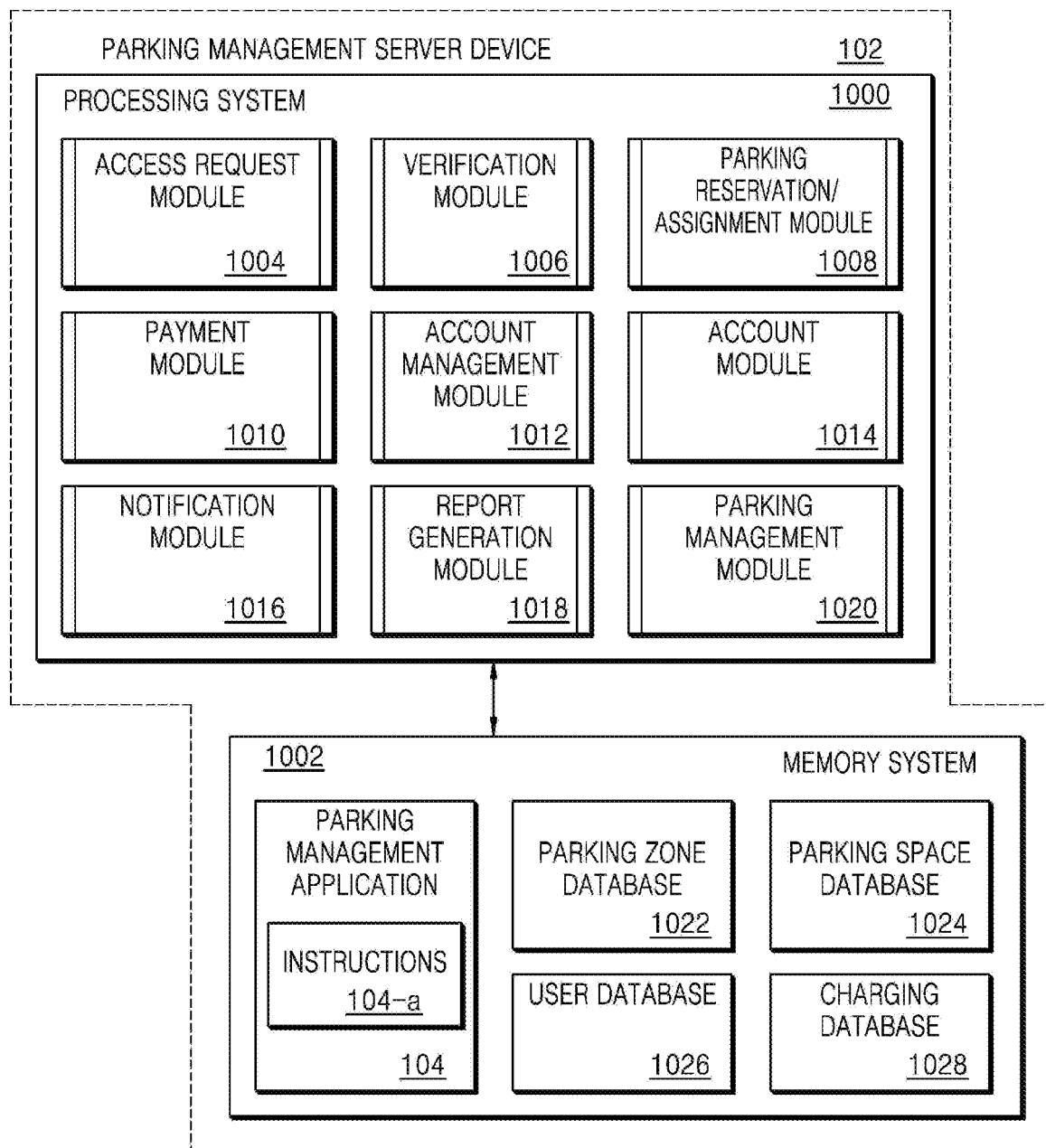
FIG. 16 is a block diagram illustrating a configuration of a parking management server device according to an embodiment.

FIG. 16 is a block diagram illustrating a hardware and software configuration of the parking management server device 102 of the parking zone access management system 100 according to an embodiment. The parking management server device 102 may mainly include a processing system 1000 and a memory system 1002 that communicate via an appropriate computer bus. The processing system 1000 may include an access request module 1004 for processing an access request procedure and service, a verification module 1006 for processing a verification procedure and service, and a parking reservation/assignment module 1008 for processing a parking-related reservation/assignment procedure and service.

The processing system 1000 may also include a payment module 1010 for processing a payment-related procedure and service, an account management module 1012 for processing an account-related procedure and service, an account module 1014 for processing an account procedure and service, a notification module 1016 for processing a notification-related procedure and service, a report generation module 1018 for providing a report generation procedure and service, and a parking management module 1020 for providing a parking management procedure and service. The modules related to the processing system 1000 of the parking management server device 102 may or may not correspond to individual blocks of a program code according to an appropriate arrangement of the modules.

The memory system 1002 may include the parking management application 104 including computer-executable instructions 104-a, a parking zone database 1022, a parking space database 1024, a user database 1026, and a charging database 1028. The databases 1022, 1024, 1026, and 1028 may be standard database formats. For example, the databases 1022, 1024, 1026, and 1028 may be formats using an object-oriented language such as Java. The databases 1022, 1024, 1026, and 1028 may be formats using a standard query language such as a structured query language (SQL), or may be a no-SQL system.

Figure 17:
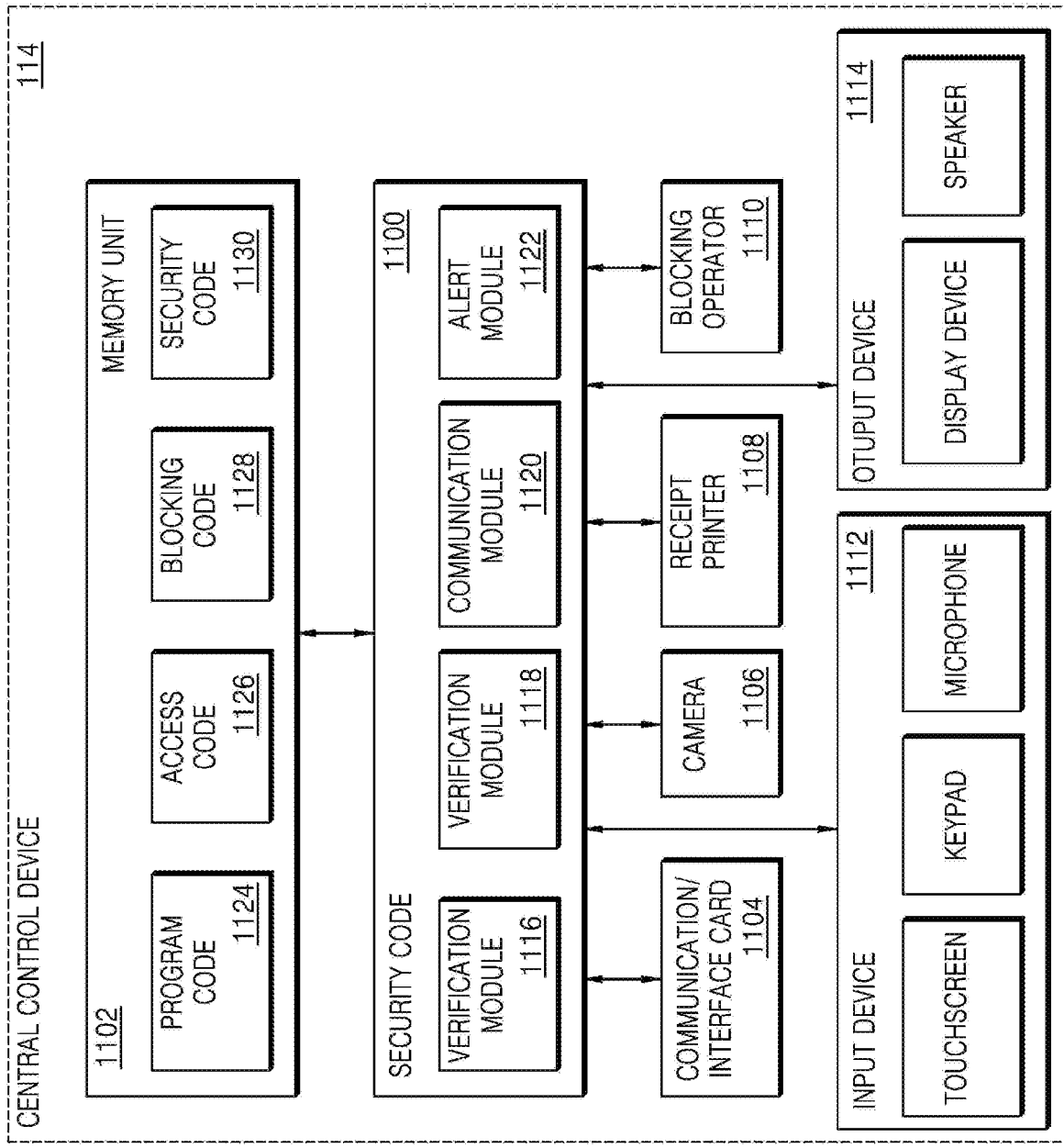
FIG. 17 is a block diagram illustrating a configuration of a central control device according to an embodiment.

FIG. 17 is a block diagram illustrating a configuration of the central control device 114, 114-a, 114-c, or 114-e of the parking zone access management system 100 according to an embodiment. The central control device 114, 114-a, 114-c, or 114-e may include a processor 1100, and a memory unit 1102 that communicates with the processor 1100, a communication/interface card 1104, a camera 1106, a receipt printer 1108, a blocking operator 1110, an input device 1112 such as a touchscreen, a keypad, and a microphone, and an output device 1100 such as a display device or a speaker, and all of the elements may be connected to the processor 1100.

The processor 1100 may include a verification module 1116 for performing a verification procedure, a blocking control module 1118 for executing a blocking control command or performing a blocking control procedure, a communication module 1120 for providing a communication service, and an alert module 1122 for providing an emergency alert service. The memory unit 1102 may include a program code 1124, an access code 1126, a blocking code 1128, and a security code 1130.

Figure 18:
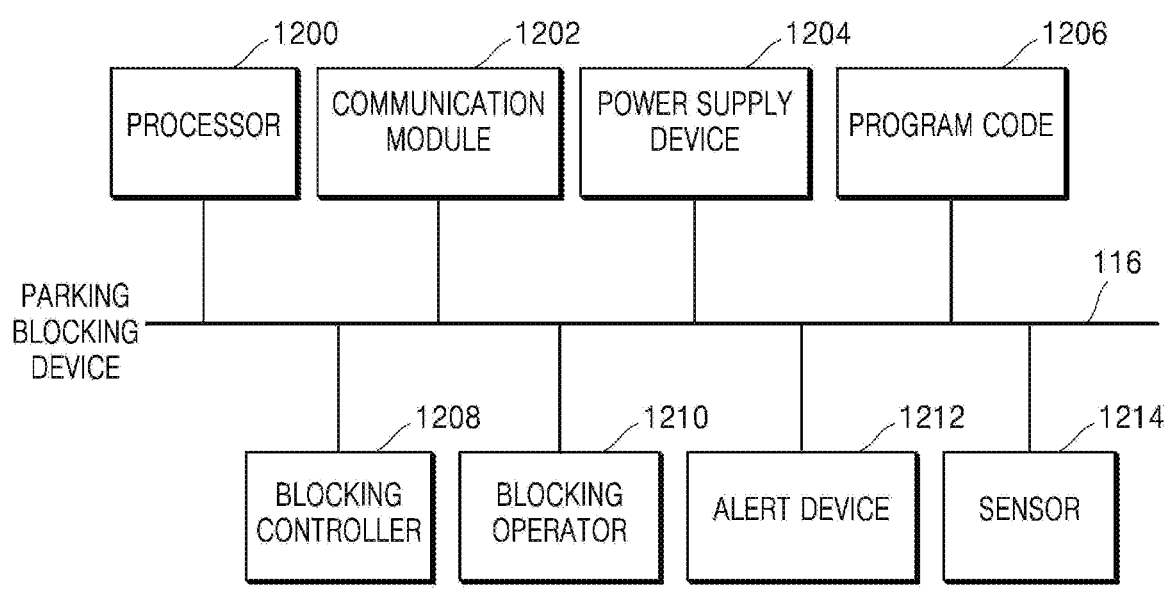
FIG. 18 is a block diagram illustrating a configuration of a parking blocking device according to an embodiment.

FIG. 18 is a block diagram illustrating a configuration of the parking blocking device 116, 116-a, 116-c, or 116-e of the parking zone access management system 100 according to an embodiment.

The parking blocking device 116, 116-a, 116-c, or 116-e may include a processor 1200, a communication module 1202, a power supply device 1204, a program code 1206 executable by the processor 1200, a blocking controller 1208, a blocking operator 1210, an alert device 1212, and a sensor 1214.

The parking blocking device 116, 116-a, 116-c, or 116-e may be of a mechanical type, and in this case, the parking blocking device 116, 116-a, 116-c, or 116-e may not include computer-related hardware and software elements. Movement of the mechanized parking blocking device 116, 116-a, 116-c, or 116-e may be controlled by the central control device 114, 114-a, 114-c, or 114-e through a physical link and connection, in order to selectively limit access to the parking space/slot 206 or 304 and a controlled vehicle access passageway in the parking zone 110, 110-a, or 110-c.

Figure 19:
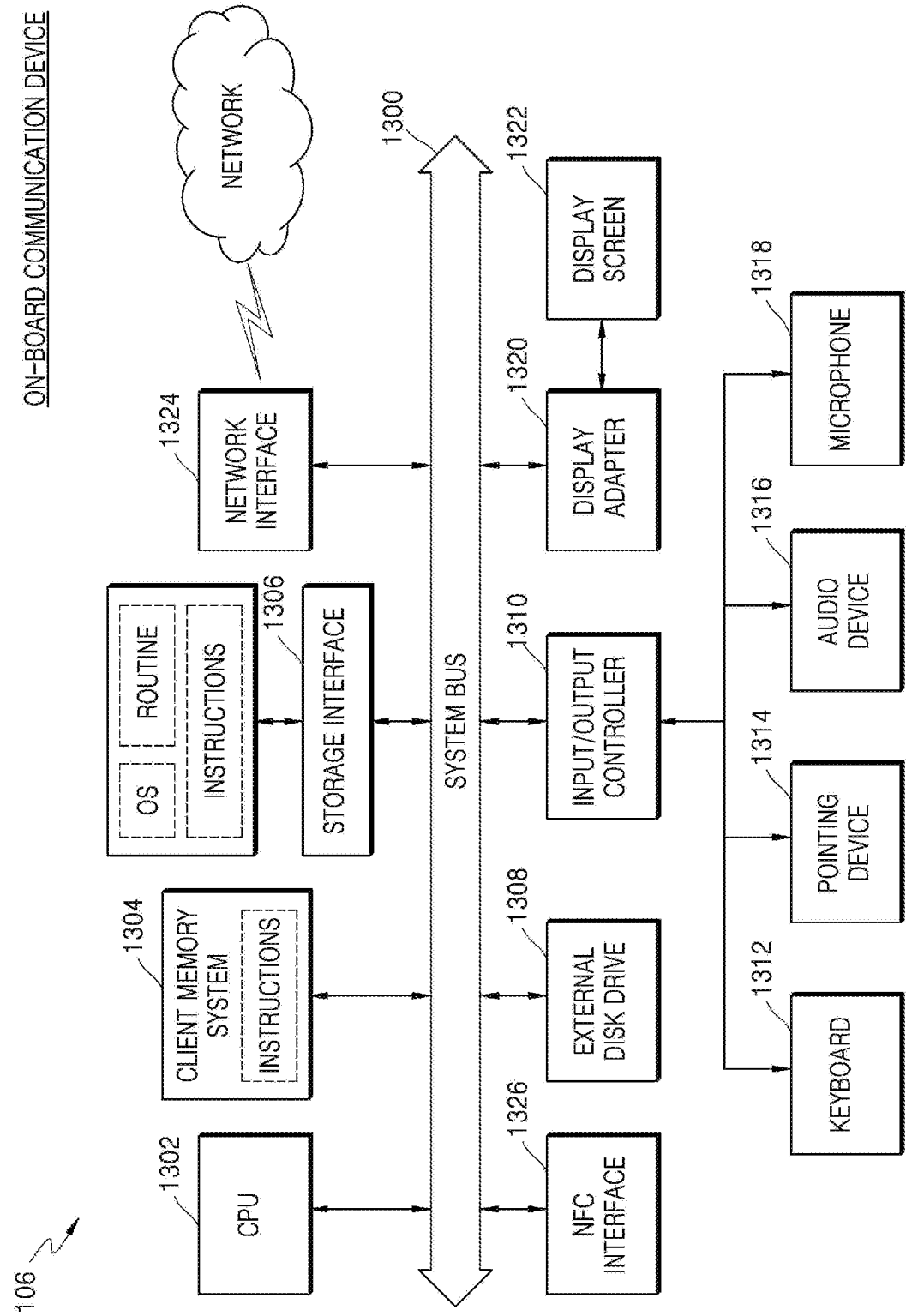
FIG. 19 is a block diagram illustrating a configuration of an on-board communication device (mobile terminal) of the parking zone access management system according to an embodiment.

FIG. 19 is a block diagram illustrating a configuration of the on-board communication device 106 of the parking zone access management system 100 according to an embodiment.

The on-board communication device 106 may include a system bus 1300 via which the following elements may communicate with one another, a client processing unit 1302 that is a CPU, a client memory system 1304 including computer-executable instructions, a storage interface 1306 for storing an operating system, a routine, and instructions, an external disk drive 1308, an input/output controller 1310 connectable to a keyboard 1312, a pointing device 1314, an audio device 1316, and a microphone 1318, a display adapter 1320 connected to a display screen 1322, a network interface 1324 for enabling data communication with another device through a data communication network or an appropriate communication network that may be an "Internet"-based internet protocol (IP), and an NFC interface 1326 for communicating an NFC signal.

Another embodiment provides a parking zone access management method in relation to the parking zone access management system 100 including the central control device 114 located in the parking zone 110, for at least one vehicle "V" including the on-board communication device 106 having the license tag "VT", the vehicle manufacturer symbol "VL", and wireless identification information read through the radio communication system 118.

The parking zone access management method according to an embodiment may include a first step in which the image-capturing device 122 captures images of the license tag VT and the vehicle manufacturer symbol VL during data communication with the central control device 114 and transmits the images to the central control device 114.

The parking zone access management method according to an embodiment may include a second step in which the wireless communication reading device 120 wirelessly communicating with the central control device 114 reads wireless identification information and transmits the wireless identification information to the central control device 114.

The parking zone access management method according to an embodiment may include a third step in which the central control device 114 generates license tag and manufacturer symbol information from the captured images of the license tag VT and the vehicle manufacturer symbol VL.

The parking zone access management method according to an embodiment may include a fourth step in which the central control device 114 generates parking zone assignment information in relation to the generated license tag, manufacturer symbol, and wireless identification information.

The parking zone access management method according to an embodiment may include a fifth step in which the central control device 114 encrypts part or a combination of the license tag and manufacturer symbol information transmitted from the image-capturing device 122, the wireless identification information transmitted from the wireless communication reading device 120, and the generated parking zone assignment information.

The parking zone access management method according to an embodiment may include a sixth step in which the central control device 114 transmits the encrypted license tag, manufacturer symbol, wireless identification, and parking zone assignment information to the parking management server device 102 during data communication with the parking management server device 102.

The parking zone access management method according to an embodiment may include a seventh step in which the central control device 114 configures a control command signal by using the generated parking zone assignment information.

The parking zone access management method according to an embodiment may include an eighth step in which when the parking blocking device 116 including the blocker 124 performs data communication with the central control device 114, the central control device 114 causes the blocker 124 to move between a first position for preventing passage of the vehicle V through the blocker 124 and a second position for allowing passage of the vehicle V through the blocker 124 based on the configured control command signal.

In the parking zone access management method according to an embodiment, the fifth step of encrypting the license tag information, the manufacturer symbol information, the wireless identification information, and the parking zone assignment information may include an additional step of performing one of attribute-based encryption, identification-based encryption, and certificate-less authenticated encryption.

The parking zone access management method according to an embodiment may include an additional step in which the central control device 114 verifies whether a combination of the encrypted license tag, manufacturer symbol, wireless identification, and parking zone assignment information is maintained or stored in the parking management server device 102.

The parking zone access management method according to an embodiment may include an additional step in which, when the combination of the encrypted license tag, manufacturer symbol, wireless identification, and parking zone assignment information is maintained or stored in the parking management server device 102, the parking management server device 102 transmits the verified combination of the encrypted license tag, manufacturer symbol, wireless identification, and parking zone assignment information to the central control device 114.

The parking zone access management method according to an embodiment may include an additional step in which the central control device 114 performs a payment processing operation, based on the verified combination of the encrypted license tag, manufacturer symbol, wireless identification, and parking zone assignment information.

The parking zone access management method according to an embodiment may include an additional step in which the central control device 114 generates a print command signal for printing a type ticket on which at least the generated parking zone assignment information is printed and transmits the print command signal to a type ticket printing device during data communication with the type ticket printing device.

A method of managing a parking zone by using biometric information of a user instead of wireless identification information will be described in detail with reference to FIGS. 20 and 21.

Figure 20:
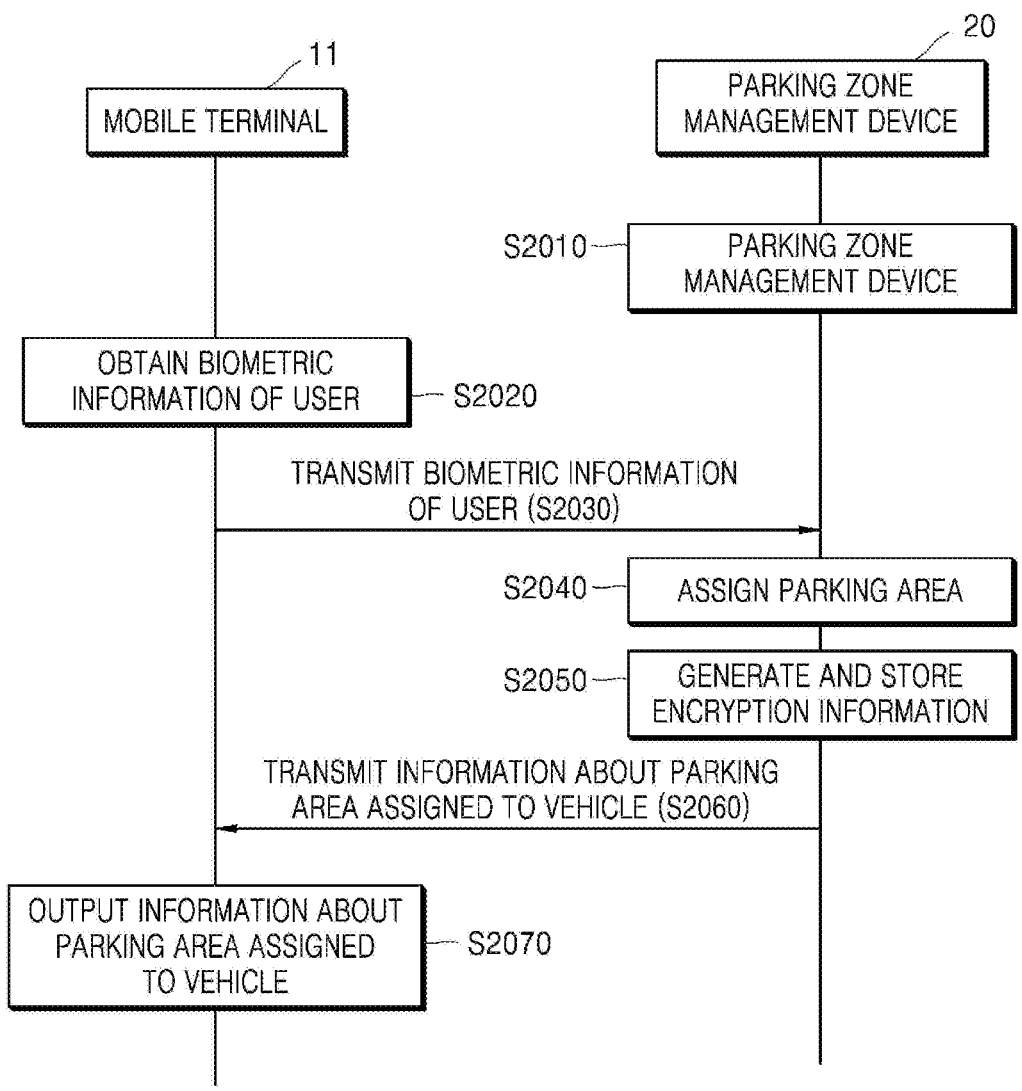
FIG. 20 is a flowchart for describing a parking zone management method using biometric information of a driver when a vehicle enters according to an embodiment.

FIG. 20 is a flowchart for describing a parking zone management method using biometric information of a driver when a vehicle enters according to an embodiment.

In operation S2010, the parking zone management device 20 may obtain information about a vehicle, which enters a parking zone, from the exterior of the vehicle. For example, the parking zone management device 20 may obtain at least one of information about a number of the vehicle, information about a manufacturer (e.g., a company or an organization) of the vehicle, and information about a model of the vehicle as information about the vehicle.

According to an embodiment, the parking zone management device 20 may capture a number plate image of the vehicle by using the sensor 21, and may obtain the information about the number of the vehicle by performing an OCR operation on the captured number plate image.

According to an embodiment, the parking zone management device 20 may capture an image of an emblem or a logo on the exterior of the vehicle, and may obtain the information about the manufacturer of the vehicle by comparing the emblem or the logo included in the captured image with an emblem and/or logo table that is pre-stored.

According to an embodiment, the parking zone management device 20 may determine the model of the vehicle, by analyzing an exterior image of the vehicle. For example, the parking zone management device 20 may determine the model of the vehicle entering the parking zone, by comparing the exterior image of the vehicle with a vehicle model feature table that is pre-stored.

According to another embodiment, the parking zone management device 20 may receive the information about the vehicle from the vehicle through the communicator 23. For example, the vehicle may broadcast or advertise a packet including a vehicle number and a vehicle manufacturer in a predetermined cycle by using V2X (e.g., DSRC (Dedicated short-range communications) or WAVE (Wireless Access in Vehicular Environments)). In this case, the parking zone management device 20 may obtain the vehicle number and the vehicle manufacturer, by analyzing the packet.

Operation S2010 corresponds to operation S210 of FIG. 2, and thus a detailed explanation thereof will not be given.

In operation S2020, the mobile terminal 11 may obtain biometric information of a user. In this case, the user who uses the vehicle may be, for example, a driver or a rider (e.g., when the vehicle is an autonomous vehicle).

The biometric information of the user is information indicating unique human characteristics that may be used for authentication, and may be at least one of, but not limited to, fingerprint information, iris information, blood vessel information (e.g., a hand vein distribution), voice information, palm line information, and face information.

According to an embodiment, the mobile terminal 11 may obtain the biometric information of the user when a specific event occurs. For example, the mobile terminal 11 may obtain the biometric information of the user when an event of receiving a request for the biometric information from the parking zone management device 20 occurs, an event of receiving a request for the biometric information through the server device 30 occurs, or an event of entering the parking zone occurs.

According to another embodiment, the mobile terminal 11 may obtain the biometric information of the user in a predetermined cycle.

According to an embodiment, the mobile terminal 11 may execute a parking management application, and may display a graphical user interface (GUI) on an execution window of the parking management application. The GUI may output a message (e.g., 'please enter your fingerprint' or 'please perform iris recognition') for inducing the user to input the biometric information. In this case, the mobile terminal 11 may receive the biometric information from the user.

In operation S2030, the mobile terminal 11 may transmit the biometric information of the user to the parking zone management device 20.

According to an embodiment, the mobile terminal 11 may transmit the biometric information to the parking zone management device 20 through short-range communication. For example, the mobile terminal 11 may transmit the biometric information to the parking zone management device 20 by using NFC, Bluetooth, or Wi-Fi.

In operation S2040, the parking zone management device 20 may assign a parking area to the vehicle. For example, the parking zone management device 20 may assign a slot 201 of the first basement as the parking area for the vehicle.

According to an embodiment, when the information about the vehicle is not normally obtained or the biometric information of the user is not received, the parking zone management device 20 may not assign the parking area to the vehicle, and may obtain again the information about the vehicle or the biometric information of the user. For example, the parking zone management device 20 may capture again an image of the exterior of the vehicle, or may request again the mobile terminal 11 in the vehicle for the biometric information.

For example, when a number plate of the vehicle is damaged, there is no manufacturer symbol, or the mobile terminal 11 does not transmit the biometric information, the vehicle may not be assigned the parking area.

In operation S2050, the parking zone management device 20 may generate encryption information, by using the information about the vehicle and the biometric information of the driver, and may store the generated encryption information.

According to an embodiment, the parking zone management device 20 may generate the encryption information, by using at least one of an attribute-based encryption method, an identification-based encryption method, and a certificateless authenticated encryption method.

According to an embodiment, the parking zone management device 20 may generate first encryption information, by encrypting part or all of the information about the vehicle (e.g., part or all of the information about the number of the vehicle, the information about the manufacturer of the vehicle, and the information about the model of the vehicle), by using the biometric information and information about the parking area assigned to the vehicle as an encryption key.

According to an embodiment, the parking zone management device 20 may generate the first encryption information, by further using position information of the vehicle in addition to the information about the vehicle and the biometric information of the user. In this case, the position information of the vehicle may include information about a current position of the vehicle or a position of the parking zone.

According to an embodiment, the parking zone management device 20 may generate the first encryption information, by encrypting the information about the vehicle (e.g., at least one of the information about the number of the vehicle, the information about the manufacturer of the vehicle, and the information about the model of the vehicle) and the position information of the vehicle, by using the biometric information as an encryption key.

According to an embodiment, the parking zone management device 20 may store the first encryption information in a memory, or may store the first encryption information in the server device 30. When the first encryption information is to be stored in the server device 30, the parking zone management device 20 may transmit the first encryption information to the server device 30 connected to the parking zone management device 20.

In operation S2060, the parking zone management device 20 may transmit the information about the parking area assigned to the vehicle to the mobile terminal 11.

According to an embodiment, the parking zone management device 20 may transmit the information about the parking area assigned to the vehicle to the mobile terminal 11 by using short-range communication. For example, the parking zone management device 20 may transmit the information about the parking area assigned to the vehicle to the mobile terminal 11 by using NFC, Bluetooth, or Wi-Fi. The information about the parking area assigned to the vehicle may include, but is not limited to, an identifier of the parking area, an image of the parking area, and a map of the parking area.

According to another embodiment, the parking zone management device 20 may transmit the information about the parking area assigned to the vehicle to the mobile terminal 11 through the server device 30.

When the parking zone management device 20 transmits the information about the parking area assigned to the vehicle to the mobile terminal 11, the parking area (parking space/slot) assigned to the vehicle is displayed on the mobile terminal 11, and thus the vehicle does not need to travel around the parking zone in order to find an empty parking area.

The parking zone management device 20 may allow passage of the vehicle, by controlling the blocker 124 installed at an entry portion of the parking zone. According to an embodiment, the parking zone management device 20 may allow passage of the vehicle, by changing a position of the blocker 124 from a first position to a second position.

In operation S2070, the mobile terminal 11 may output the information about the parking area assigned to the vehicle.

According to an embodiment, the mobile terminal 11 may display the information about the parking area assigned to the vehicle through the parking management application. Also, the mobile terminal 11 may display a movement path from the current position of the vehicle to the parking area assigned to the vehicle.

An operation, performed by the parking zone management device 20, of managing passage of a vehicle trying to exit a parking zone will be described with reference to FIG. 21.

Figure 21:
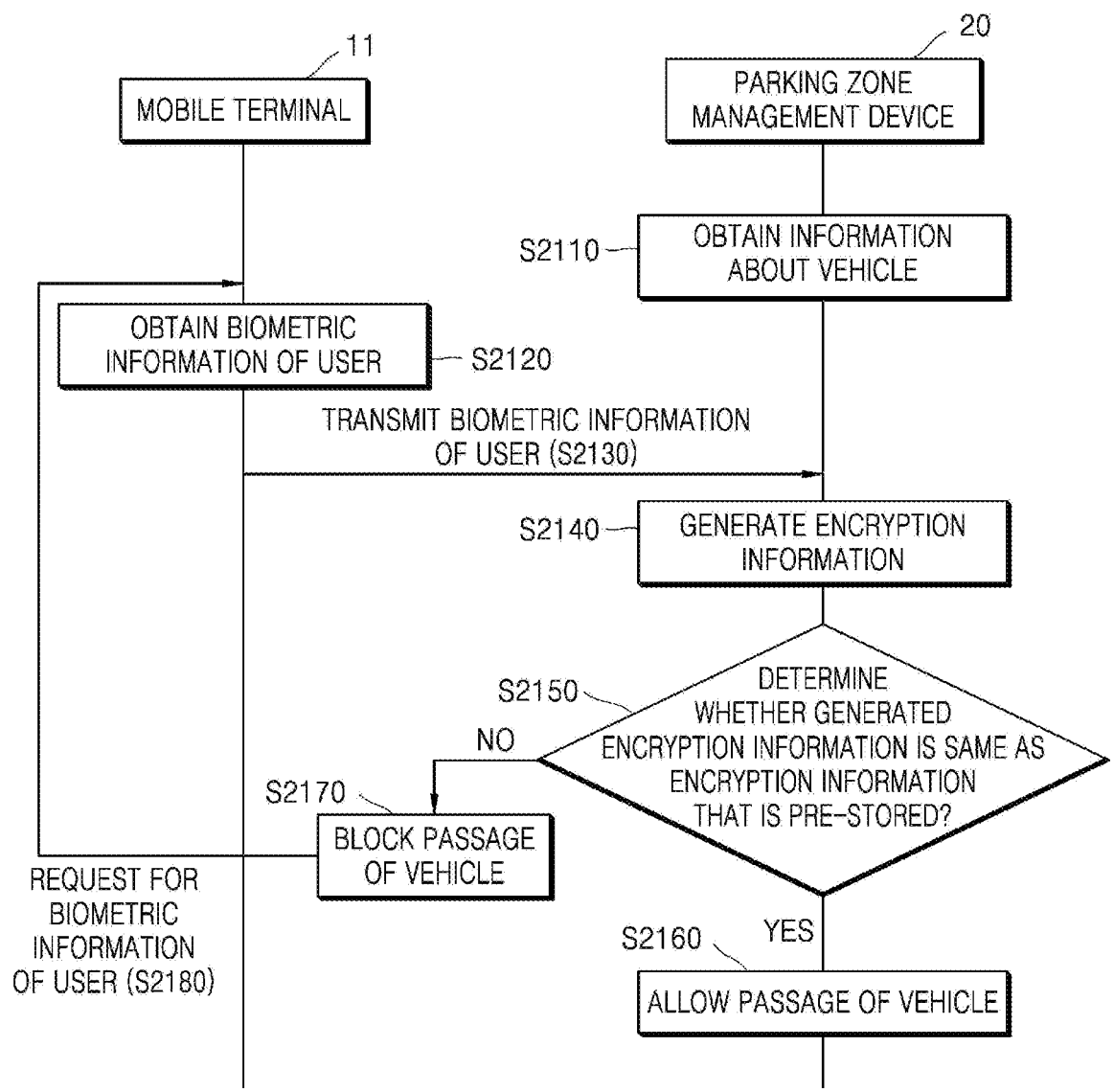
FIG. 21 is a flowchart for describing a parking zone management method using biometric information of a driver when a vehicle exits according to an embodiment.

FIG. 21 is a flowchart for describing a parking zone management method using biometric information of a driver when a vehicle exits according to an embodiment.

In operation S2110, the parking zone management device 20 may obtain information about a vehicle, which tries to exit a parking zone, from the exterior of the vehicle. For example, the parking zone management device 20 may capture an image of the exterior of the vehicle that tries to exit, and may obtain at least one of information about a number of the vehicle, information about a manufacturer (e.g., a company or an organization) of the vehicle, and information about a model of the vehicle from the captured image.

According to another embodiment, the parking zone management device 20 may receive the information about the vehicle from the vehicle through the communicator 23. For example, the vehicle may broadcast or advertise a packet including a vehicle number and a vehicle manufacture in a predetermined cycle by using V2X (e.g., DSRC (Dedicated short-range communications) or WAVE (Wireless Access in Vehicular Environments)). In this case, the parking zone management device 20 may obtain the vehicle number and the vehicle manufacturer, by analyzing the packet.

Operation S2110 corresponds to operation S2010 of FIG. 20, and thus a detailed explanation thereof will not be given.

In operation S2120, the mobile terminal 11 may obtain biometric information of a user.

According to an embodiment, the mobile terminal 11 may obtain the biometric information of the user when a specific event occurs. For example, the mobile terminal 11 may obtain the biometric information of the user when an event of receiving a request for the biometric information from the parking zone management device 20 occurs, an event of receiving a request for the biometric information through the server device 30 occurs, or an event of exiting the parking zone occurs.

According to another embodiment, the mobile terminal 11 may obtain the biometric information of the user in a predetermined cycle.

According to an embodiment, the mobile terminal 11 may execute a parking management application, and may display a GUI on an execution window of the parking management application. The GUI may output a message (e.g., 'please enter your fingerprint' or 'please perform iris recognition') for inducing the user to input the biometric information. In this case, the mobile terminal 11 may receive the biometric information from the user.

The biometric information obtained by the mobile terminal 10 may be the same type of information as that obtained when the vehicle enters the parking zone. For example, when the mobile terminal 10 obtains fingerprint information as the biometric information from the user when the vehicle enters the parking zone, the mobile terminal 10 may obtain the fingerprint information as the biometric information even when the vehicle exits the parking zone.

In operation S2130, the parking zone management device 20 may transmit the biometric information of the user.

According to an embodiment, the mobile terminal 11 may transmit the biometric information to the parking zone management device 20 through short-range communication. For example, the mobile terminal 11 may transmit the biometric information to the parking zone management device 20 by using NFC, Bluetooth, or Wi-Fi.

In operation S2140, the parking zone management device 20 may generate encryption information.

According to an embodiment, the parking zone management device 20 may generate the encryption information (second encryption information), by using an encryption algorithm used when the vehicle enters the parking zone. For example, when first encryption information is generated by using an identification-based encryption method from among an attribute-based encryption method, the identification-based encryption method, and a certificate-less authenticated encryption method when the vehicle enters the parking zone, the parking zone management device 20 may generate the second encryption information by using the identification-based encryption method.

Also, the parking zone management device 20 may generate the second encryption information by using the same type of information as that used to generate the first encryption information. For example, when the parking zone management device 20 generates the first encryption information corresponding to the vehicle that enters the parking zone by encrypting the information about the number of the vehicle, the information about the manufacturer of the vehicle, and position information of the vehicle by using the biometric information as an encryption key, the parking zone management device 20 may generate the second encryption information corresponding to the vehicle that exits the parking zone by encrypting the information about the number of the vehicle, the information about the manufacturer of the vehicle, and the position information of the vehicle by using the biometric information as an encryption key.

In operation S2150, the parking zone management device 20 may compare the generated encryption information with encryption information that is pre-stored.

According to an embodiment, the parking zone management device 20 may check whether there exists encryption information (i.e., the first encryption information) matching the second encryption information in an encryption information list stored in a memory. Alternatively, when the first encryption information is matched to identification information of the vehicle and is stored, the parking zone management device 20 may extract the first encryption information that is matched to the identification information of the vehicle and is stored from the memory, and may determine whether the extracted first encryption information matches the second encryption information.

According to another embodiment, the parking zone management device 20 may transmit the second encryption information to the server device 30, and may request the server device 30 to verify the second encryption information. In this case, the server device 30 may check whether there exists encryption information (i.e., the first encryption information) matching the second encryption information in an encryption information list stored in a database, and may transmit a checking result to the parking zone management device 20. Alternatively, the server device 30 may receive the identification information of the vehicle along with a verification request for the second encryption information, and may extract the first encryption information corresponding to the identification information of the vehicle from the encryption information list. The server device 30 may determine whether the extracted first encryption information matches the second encryption information, and may transmit a determination result to the parking zone management device 20.

In operation S2160, when a similarity between the generated encryption information and encryption information that is pre-stored is equal to or greater than a threshold value, the parking zone management device 20 may allow passage of the vehicle.

For example, the parking zone management device 20 may allow the vehicle to exit the parking zone, by adjusting a position of the blocker 124 from a first position to a second position.

In operation S2170, when a similarity between the generated encryption information and the encryption information that is pre-stored is less than the threshold value, the parking zone management device 20 may block passage of the vehicle.

For example, when the user of the vehicle is changed from a first user to a second user, first biometric information of the first user and second biometric information of the second user may be different from each other. Also, the first encryption information generated by using the first biometric information of the first user and the second encryption information generated by using the second biometric information of the second user may be different from each other. Accordingly, because the first encryption information and the second encryption information do not match each other, the parking zone management device 20 may prevent the vehicle from exiting the parking zone, by controlling the position of the blocker 124.

In operation S2170, the parking zone management device 20 may request again the mobile terminal 11 for the biometric information of the user.

Although not described in FIGS. 20 and 21, according to an embodiment, the parking zone management device 20 may manage the parking zone by using both the biometric information of the user and wireless identification information of the mobile terminal 11.

A method according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for the present disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program commands such as a ROM, a random-access memory (RAM), or a flash memory Examples of the program commands are advanced language codes that may be executed by a computer by using an interpreter or the like as well as machine language codes made by a compiler.

Some embodiments may be implemented as a recording medium including instructions executable by a computer such as a program module executed by a computer. A computer-readable recording medium may be an arbitrary available medium accessible by a computer, and examples thereof include all volatile and non-volatile media and separable and non-separable media. Examples of the computer-readable recording medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, and other data. The communication medium typically includes computer-readable instructions, a data structure, a program module, other data of a modulated data signal such as a carrier wave, or another transmission mechanism, and an example thereof includes an arbitrary information transmission medium. Also, some embodiments may be implemented as a computer program or a computer program product including computer-executable instructions such as a computer program executed by a computer.

While the present disclosure has been particularly shown and described with reference to embodiments thereof, it will be understood by one of ordinary skill in the art that various changes and modifications may be made therein without departing from the spirit and scope of the present disclosure as defined by the following claims.

The invention claimed is:

1. A server device comprising:
a receiver configured to receive, from a management device located in a parking zone:
first identification information about a first vehicle attempting to enter the parking zone based on an image of an exterior of the first vehicle captured by a sensor of the management device, and
first wireless identification information received from a mobile terminal located in the first vehicle;
a controller configured to generate first encryption information corresponding to the first vehicle based on the first identification information about the first vehicle and the first wireless identification information and assign a parking area in the parking zone to the first vehicle based on the generated first encryption information; and
a transmitter configured to transmit information about the parking area with a movement path from a current position of the first vehicle to the assigned parking area to the mobile terminal, and transmit, to the management device, a signal for controlling a blocker to cause the first vehicle to move to the assigned parking area assigned to the first vehicle,
wherein the receiver receives, from the management device:
second identification information about a second vehicle attempting to exit the parking zone based on an image of an exterior of the second vehicle captured by a sensor of the management device, and
second wireless identification information received from a mobile terminal located in the second vehicle,
wherein the controller generates second encryption information using the second identification information about the second vehicle and the second wireless identification information, compares the second encryption information with the first encryption information, and in response to the second encryption information matching the first encryption information, determines a parking fee of the second vehicle, based on an interval between a first time of the first encryption information is generated and a second time of the second encryption information is generated,
wherein the transmitter transmits, to the management device, a signal for controlling an exit blocker to cause the first vehicle to exit the parking zone, in response to the second encryption information matching the first encryption information, after the determined parking fee is paid, and wherein the exit blocker comprises: a base bolted to a ground surface; and a blocking arm rotatably coupled to the base and configured to rotate from a blocking position to an open position, and wherein the first encryption information and the second encryption match when the first vehicle and the second vehicle are a same vehicle, and wherein the first encryption information and the second encryption do not match when the first vehicle and the second vehicle are not the same vehicle.

2. The server device of claim 1, wherein the controller is further configured to generate the first encryption information, by encrypting part or all of the first identification information about the first vehicle, by using the first wireless identification information and the information about the parking area as an encryption key.

3. The server device of claim 1, wherein the controller is further configured to generate the first encryption information, by further using position information of the first vehicle.

4. The server device of claim 1, wherein the controller is further configured to obtain biometric information of a user riding in the first vehicle, and generate the first encryption information, by further using the biometric information.

5. The server device of claim 1, wherein the parking zone includes a plurality of parking blocking devices and a plurality of parking areas, each of the parking blocking devices located within a respective parking area.

6. The server device of claim 1, wherein the blocker is configured to rotate from the blocking position in which the blocker extends vertically from the base to the open position in which the blocker is horizontally disposed against the base.

7. The server device of claim 1, further comprising receiving vehicle occupancy information from the management device, the vehicle occupancy information obtained from a vehicle occupancy sensing device disposed in the parking area.

8. The server device of claim 1, wherein the exit blocker is configured to rotate from the blocking position in which the blocking arm extends horizontally from the base to the open position in which the blocking arm is extended vertically upward from the base.

9. The server device of claim 1, wherein the image of an exterior of the second vehicle comprises a logo on the first vehicle.

10. A method, performed by a server device, of managing a parking zone, the method comprising:
  receiving, from a management device located in a parking zone:
    first identification information about a first vehicle attempting to enter the parking zone, based on an image of an exterior of the first vehicle captured by a sensor of the management device, and
    wireless identification information received from a mobile terminal located in the first vehicle;
  generating first encryption information corresponding to the first vehicle based on the first identification information about the first vehicle and the wireless identification information;
  assigning a parking area in the parking zone to the first vehicle based on the generated first encryption information;
  transmitting information about the parking area with a movement path from a current position of the first vehicle to the assigned parking area to the mobile terminal;
  transmitting, to the management device, a signal for controlling a blocker to cause the first vehicle to move to the assigned parking area assigned to the first vehicle;
  receiving, from the management device:
    second identification information about a second vehicle attempting to exit the parking zone based on an image of an exterior of the second vehicle captured by a sensor of the management device, and
    second wireless identification information received from a mobile terminal located in the second vehicle;
  generating second encryption information using the second identification information about the second vehicle and the second wireless identification information, compares the second encryption information with the first encryption information, and in response to the second encryption information matching the first encryption information, determines a parking fee of the second vehicle, based on an interval between a first time of the first encryption information is generated and a second time of the second encryption information is generated; and
  transmitting, to the management device, a signal for controlling an exit blocker to cause the first vehicle to exit the parking zone, in response to the second encryption information matching the first encryption information, after the determined parking fee is paid,
  wherein the exit blocker comprises: a base bolted to a ground surface; and a blocking arm rotatably coupled to the base and configured to rotate from a blocking position to an open position, and
  wherein the first encryption information and the second encryption match when the first vehicle and the second vehicle are a same vehicle, and wherein the first encryption information and the second encryption do not match when the first vehicle and the second vehicle are not the same vehicle.

11. The method of claim 10, wherein the generating of the first encryption information comprises encrypting part or all of the first identification information about the first vehicle, by using the wireless identification information and the first identification information about the parking area as an encryption key.

12. The method of claim 10, wherein the generating of the first encryption information comprises generating the first encryption information, by further using position information of the first vehicle.

13. The method of claim 10, wherein the generating of the first encryption information comprises:
  obtaining biometric information of a user riding in the first vehicle; and
  generating the first encryption information, by further using the biometric information.

14. The method of claim 10, wherein the first identification information about the first vehicle comprises at least one of information about a number of the first vehicle, information about a manufacturer of the first vehicle, and information about a model of the first vehicle.

* * * * *